United States Patent
Nakamura et al.

(10) Patent No.: US 12,263,551 B2
(45) Date of Patent: Apr. 1, 2025

(54) ROTARY SHAFT LOCKING DEVICE, MACHINING HEAD, AND MULTI-TASKING MACHINE

(71) Applicant: Yamazaki Mazak Corporation, Niwa-gun (JP)

(72) Inventors: Shinya Nakamura, Niwa-gun (JP); Hiroto Sasaki, Niwa-gun (JP); Kimihiko Sato, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 185 days.

(21) Appl. No.: 18/317,096

(22) Filed: May 15, 2023

(65) Prior Publication Data
US 2023/0286089 A1    Sep. 14, 2023

Related U.S. Application Data

(63) Continuation of application No. PCT/JP2020/048836, filed on Dec. 25, 2020.

(51) Int. Cl.
  *B23Q 1/70*  (2006.01)
  *B23Q 5/04*  (2006.01)
  *F16C 19/18* (2006.01)

(52) U.S. Cl.
  CPC ............... *B23Q 1/70* (2013.01); *B23Q 5/04* (2013.01); *F16C 19/181* (2013.01)

(58) Field of Classification Search
  CPC ............ B23Q 1/70; B23Q 5/04; F16C 19/181
  See application file for complete search history.

(56) References Cited

U.S. PATENT DOCUMENTS

| 4,551,032 A | 11/1985 | Mottershead |
| 9,233,443 B2 * | 1/2016 | Moriguchi ............ F16C 19/546 |

(Continued)

FOREIGN PATENT DOCUMENTS

| CN | 202199874 U | 4/2012 | |
| CN | 108067638 A * | 5/2018 | ............... B23Q 1/70 |

(Continued)

OTHER PUBLICATIONS

International Preliminary Report on Patentability (Chapter I) with translation of Written Opinion for corresponding International Application No. PCT/JP2020/048836, Jul. 6, 2023.

(Continued)

*Primary Examiner* — Daniel D Yabut
(74) *Attorney, Agent, or Firm* — MORI & WARD, LLP

(57) ABSTRACT

A rotary shaft locking device includes a rotary shaft, a first angular contact ball bearing, a support, and an actuator. The rotary shaft is rotatable about a first axis and has a first contact surface. The first angular contact ball bearing includes an inner ring connected to the rotary shaft, an outer ring, and a plurality of balls disposed between the inner ring and the outer ring. The support has a second contact surface and rotatably supports the rotary shaft via the first angular contact ball bearing. The actuator is configured to move the rotary shaft and the inner ring with respect to the support and the outer ring in a first direction parallel to the first axis so that the first contact surface contacts the second contact surface to prohibit the rotary shaft from rotating and so that precompression that acts on the plurality of balls is reduced.

20 Claims, 29 Drawing Sheets

(56) References Cited

U.S. PATENT DOCUMENTS

| | | | |
|---|---|---|---|
| 9,644,674 B2* | 5/2017 | Kim | F16C 25/08 |
| 2006/0034670 A1* | 2/2006 | Sugita | B23Q 5/10 |
| | | | 409/231 |
| 2008/0112769 A1* | 5/2008 | Mochizuki | F16C 39/02 |
| | | | 408/124 |
| 2011/0081216 A1* | 4/2011 | Ogura | F16C 25/083 |
| | | | 409/141 |
| 2011/0221292 A1 | 9/2011 | Kuwahara et al. | |
| 2016/0207154 A1* | 7/2016 | Nebuka | B23Q 1/265 |
| 2019/0202016 A1* | 7/2019 | Huang | B23B 31/006 |

FOREIGN PATENT DOCUMENTS

| | | | | |
|---|---|---|---|---|
| CN | 109894635 | | 6/2019 | |
| DE | 102010048546 | | 4/2012 | |
| DE | 102016200299 A1 | * | 7/2016 | |
| EP | 3112714 | | 1/2017 | |
| JP | S60-029014 B2 | | 7/1985 | |
| JP | H04-050595 U | | 4/1992 | |
| JP | H10-225802 | | 8/1998 | |
| JP | H11-010485 | | 1/1999 | |
| JP | 2000-210826 | | 8/2000 | |
| JP | 2004-034223 | | 2/2004 | |
| JP | 2004036747 A | * | 2/2004 | F16C 25/08 |
| JP | 2005-052932 | | 3/2005 | |
| JP | 2009293614 A | * | 12/2009 | |
| JP | 2010-151313 | | 7/2010 | |
| JP | 2013-170656 | | 9/2013 | |
| JP | 2019-104066 | | 6/2019 | |
| WO | WO 2008/074296 | | 6/2008 | |
| WO | WO 2015/129823 | | 9/2015 | |

OTHER PUBLICATIONS

Chinese Office Action for corresponding CN Application No. 202080107596.9, Oct. 16, 2023.
Supplementary European Search Report for corresponding EP Application No. 20967024.9-1103, Nov. 14, 2023.
EP Office Action for corresponding EP Application No. 20967024.9-1103, Nov. 24, 2023.
European Office Action for corresponding EP Application No. 20967024.9-1103, May 10, 2024.
International Search Report for corresponding International Application No. PCT/JP2020/048836, Mar. 30, 2021.
Written Opinion for corresponding International Application No. PCT/JP2020/048836, Mar. 30, 2021.
Japanese Office Action for corresponding JP Application No. 2021-523518, Oct. 5, 2021, w/ English machine translation).

* cited by examiner

ROTARY SHAFT LOCKING DEVICE, MACHINING HEAD, AND MULTI-TASKING MACHINE

CROSS-REFERENCE TO RELATED APPLICATIONS

The present application is a continuation application of International Application No. PCT/JP2020/048836, filed Dec. 25, 2020. The contents of this application are incorporated herein by reference in their entirety.

BACKGROUND OF THE INVENTION

Field of the Invention

The present invention relates to a rotary shaft locking device, a machining head, and a multi-tasking machine.

Discussion of the Background

Spindle units capable of securing a spindle of a machine tool are known.

A related technique includes a spindle unit of a machine tool disclosed in JP 2005-52932 A. The spindle unit disclosed in JP 2005-52932 A secures a spindle by the engagement between a coupling member located behind a front end wall and a coupling member located on a flange on an outer surface of the spindle. The spindle unit disclosed in JP 2005-52932 A includes a second fluid pressure means, which is capable of pressing a bearing case rearward, and a third fluid pressure means, which is capable of pressing the bearing case forward. In the spindle unit disclosed in JP 2005-52932 A, the levels of the forward pressure that acts on the bearing case and the rearward pressure that acts on the bearing case are the same but the forward pressure and the rearward pressure act in opposite directions. Thus, in securing the spindle, no load is applied to the bearing.

SUMMARY OF THE INVENTION

According to one aspect of the present invention, a rotary shaft locking device includes a rotary shaft, a first angular contact ball bearing, a support, and an actuator. The rotary shaft is rotatable about a first axis and has a first contact surface and a mounting portion on which a tool is configured to be mounted. The first angular contact ball bearing includes an inner ring connected to the rotary shaft to surround the rotary shaft around the first axis such that the inner ring is rotatable together with the rotary shaft around the first axis; an outer ring provided opposite to the inner ring to surround the inner ring around the first axis; and a plurality of balls disposed between the inner ring and the outer ring such that the outer ring supports the inner ring via the plurality of balls and such that the inner ring and the outer ring are relatively rotatable around the first axis. The outer ring is connected to the support which rotatably supports the rotary shaft via the first angular contact ball bearing. The support has a second contact surface which is configured to contact the first contact surface to prohibit the rotary shaft from rotating. The actuator is configured to move the rotary shaft and the inner ring with respect to the support and the outer ring in a first direction parallel to the first axis so that the first contact surface contacts the second contact surface and so that precompression that acts on the plurality of balls is reduced.

According to another aspect of the present invention, a machining head includes a first rotary actuator which is configured to rotate a rotary shaft about a first axis, a housing which surrounds the rotary shaft, and a rotary shaft locking device which includes the rotary shaft, a first angular contact ball bearing, a support, and an actuator. The rotary shaft is rotatable about a first axis and has a first contact surface and a mounting portion on which a tool is configured to be mounted. The first angular contact ball bearing includes an inner ring connected to the rotary shaft to surround the rotary shaft around the first axis such that the inner ring is rotatable together with the rotary shaft around the first axis; an outer ring provided opposite to the inner ring to surround the inner ring around the first axis; and a plurality of balls disposed between the inner ring and the outer ring such that the outer ring supports the inner ring via the plurality of balls and such that the inner ring and the outer ring are relatively rotatable around the first axis. The outer ring is connected to the support which rotatably supports the rotary shaft via the first angular contact ball bearing. The support has a second contact surface which is configured to contact the first contact surface to prohibit the rotary shaft from rotating. The actuator is configured to move the rotary shaft and the inner ring with respect to the support and the outer ring in a first direction parallel to the first axis so that the first contact surface contacts the second contact surface and so that precompression that acts on the plurality of balls is reduced.

According to the other aspect of the present invention, a multi-tasking machine includes a machining head, a workpiece holding device, machining head actuator, and a controller. The machining head includes a rotary shaft locking device, a first rotary actuator configured to rotate a rotary shaft about a first axis, and a housing surrounding the rotary shaft. The workpiece holding device is configured to hold a workpiece. The machining head actuator is configured to move the machining head relative to the workpiece holding device. The rotary shaft locking device includes the rotary shaft, a first angular contact ball bearing, a support, and an actuator. The rotary shaft is rotatable about a first axis and has a first contact surface and a mounting portion on which a tool is configured to be mounted. The first angular contact ball bearing includes an inner ring connected to the rotary shaft to surround the rotary shaft around the first axis such that the inner ring is rotatable together with the rotary shaft around the first axis; an outer ring provided opposite to the inner ring to surround the inner ring around the first axis; and a plurality of balls disposed between the inner ring and the outer ring such that the outer ring supports the inner ring via the plurality of balls and such that the inner ring and the outer ring are relatively rotatable around the first axis. The outer ring is connected to the support which rotatably supports the rotary shaft via the first angular contact ball bearing. The support has a second contact surface which is configured to contact the first contact surface to prohibit the rotary shaft from rotating. The actuator is configured to move the rotary shaft and the inner ring with respect to the support and the outer ring in a first direction parallel to the first axis. The workpiece holding device includes a workpiece holder configured to hold a workpiece, a second support configured to support the workpiece holder to be rotatable about a second axis, and a second rotary actuator configured to rotate the workpiece holder about the second axis. The machining head actuator is configured to move the machining head relative to the workpiece holding device when the controller transmits a first control signal to the machining head actuator. The first rotary actuator is configured to rotate the rotary shaft about the first axis when the controller transmits a second control signal to the first rotary actuator. The second rotary actuator is configured to rotate the workpiece holder about the second axis when the controller transmits a third control signal to the second rotary actuator. When the controller transmits a fourth control signal to the actuator, the actuator is configured to move the rotary shaft and the inner ring relative to the support and the outer ring in the first direction so that the first contact surface contacts the second contact surface and so that precompression that acts on the plurality of balls is reduced.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
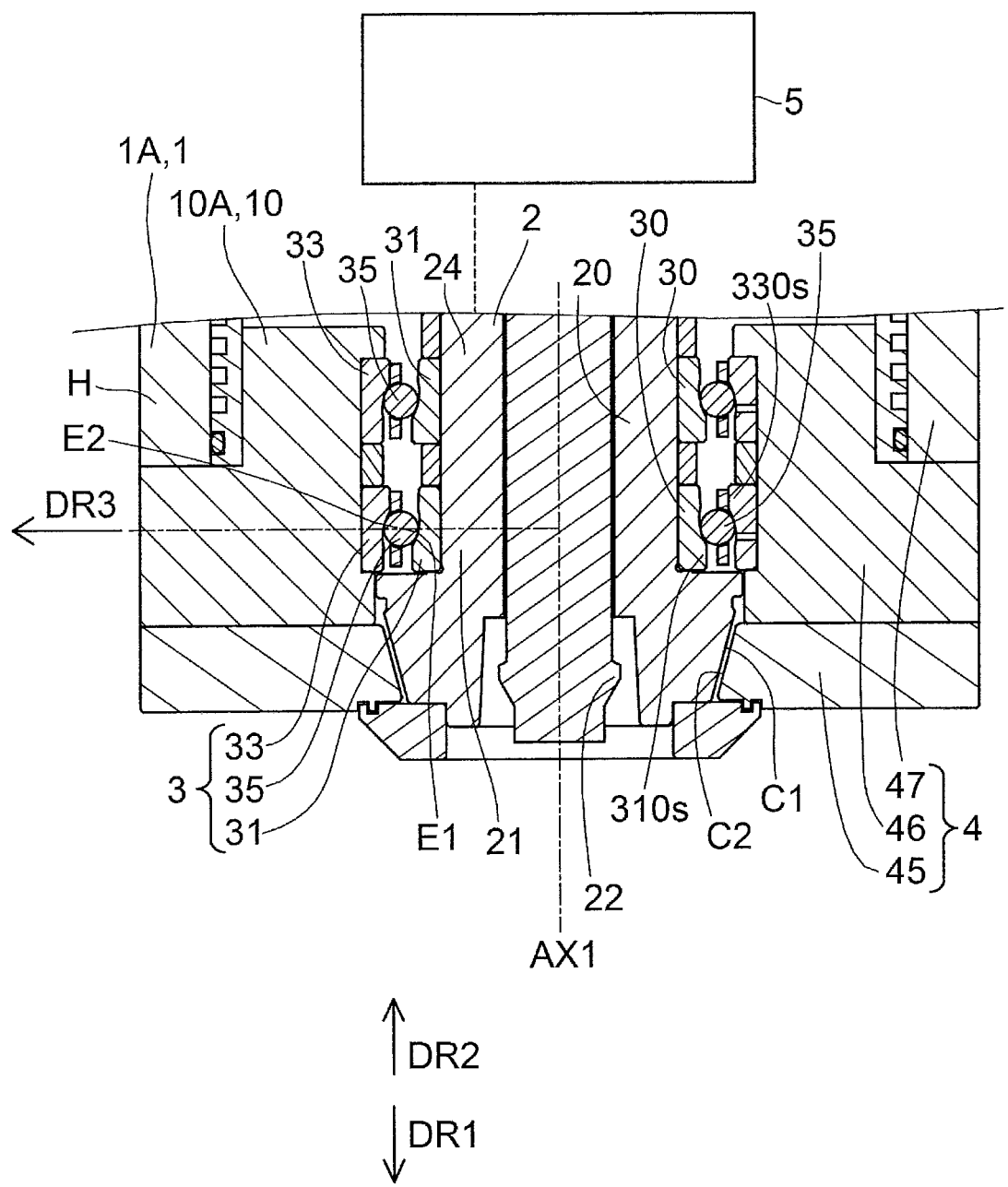
FIG. 1 is a schematic cross-sectional view of part of a machining head according to a first embodiment.

The embodiments will now be described with reference to the accompanying drawings, wherein like reference numerals designate corresponding or identical elements throughout the various drawings.

A machining head 1, a rotary shaft locking device 10, and a multi-tasking machine 100 according to some embodiments will hereafter be described with reference to the drawings. In the following description of the embodiments, identical reference numerals are given to portions and members having identical functions, and descriptions of the portions and members with the identical reference numerals that are deemed redundant will be omitted.

First Embodiment

Figure 2:
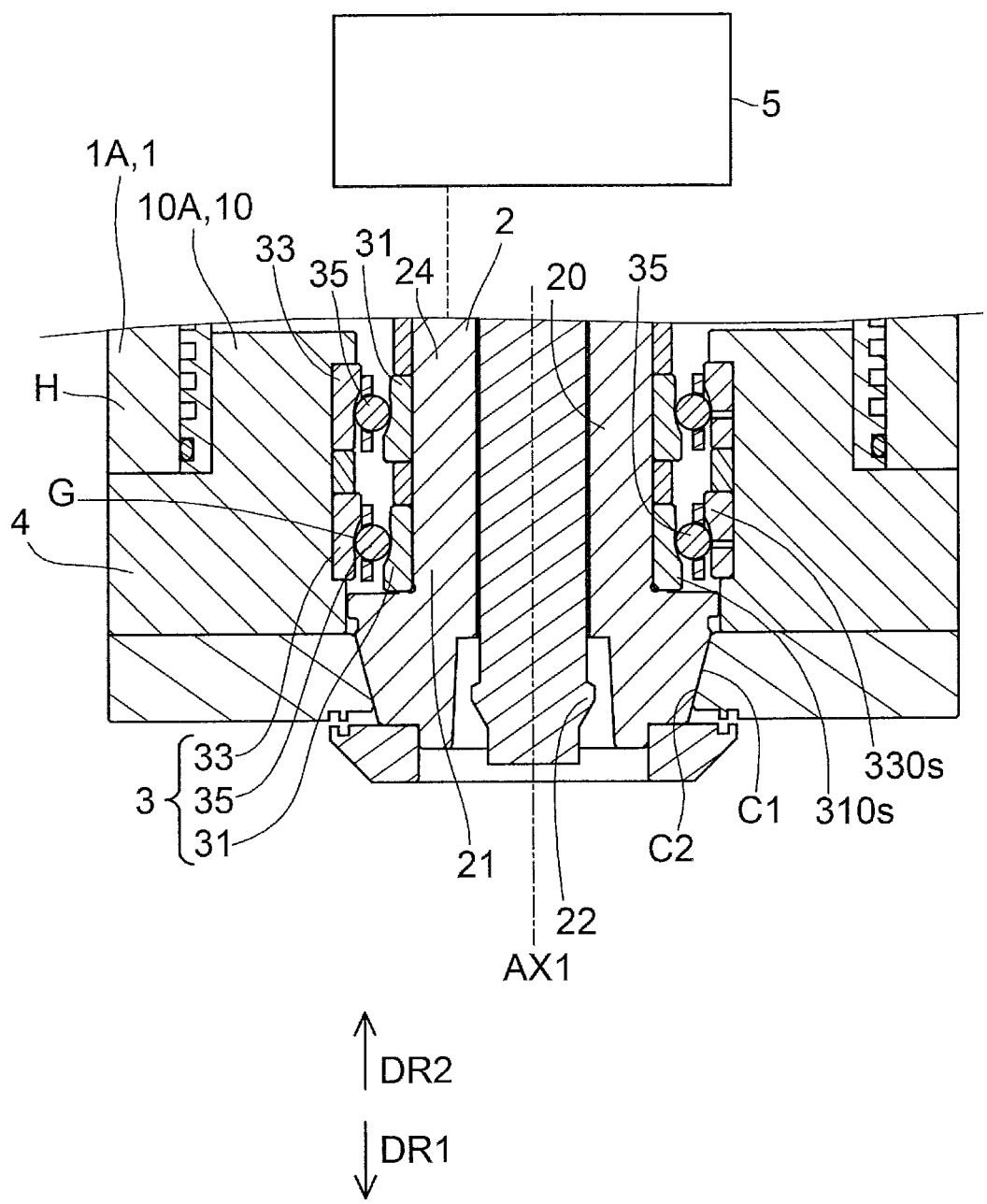
FIG. 2 is a schematic cross-sectional view of part of the machining head according to the first embodiment.
Figure 3:
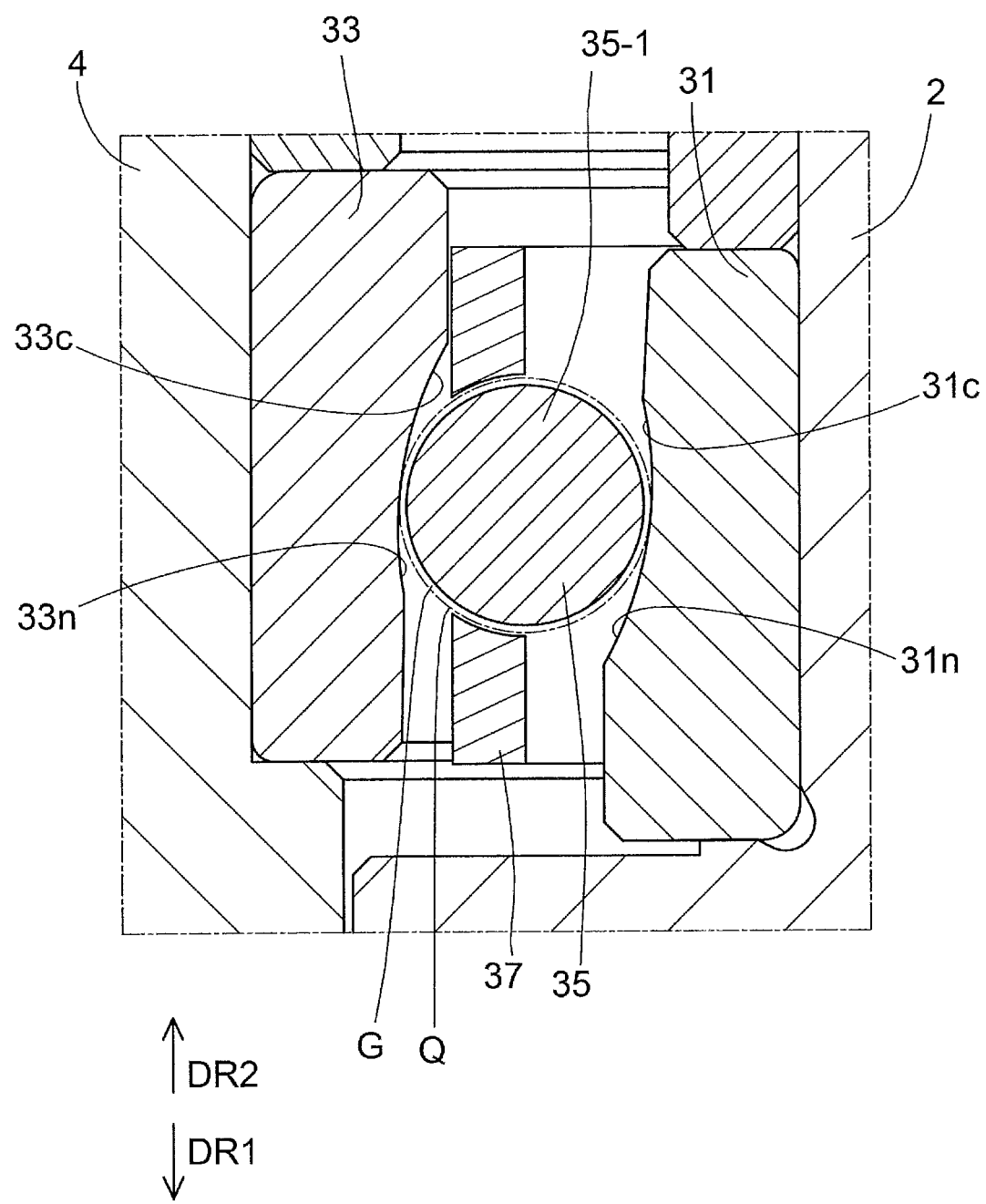
FIG. 3 is an enlarged schematic cross-sectional view of part of a first angular contact ball bearing and the surrounding section.
Figure 4:
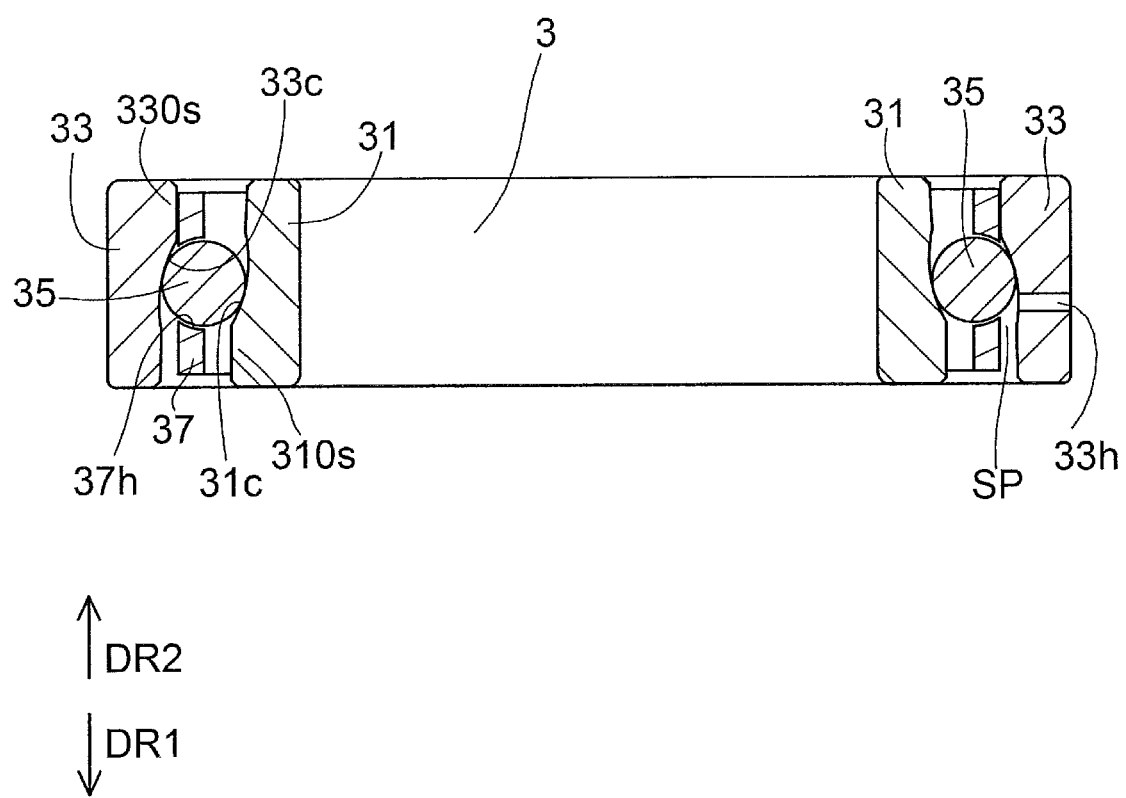
FIG. 4 is a schematic cross-sectional view of the first angular contact ball bearing according to an embodiment.
Figure 5:
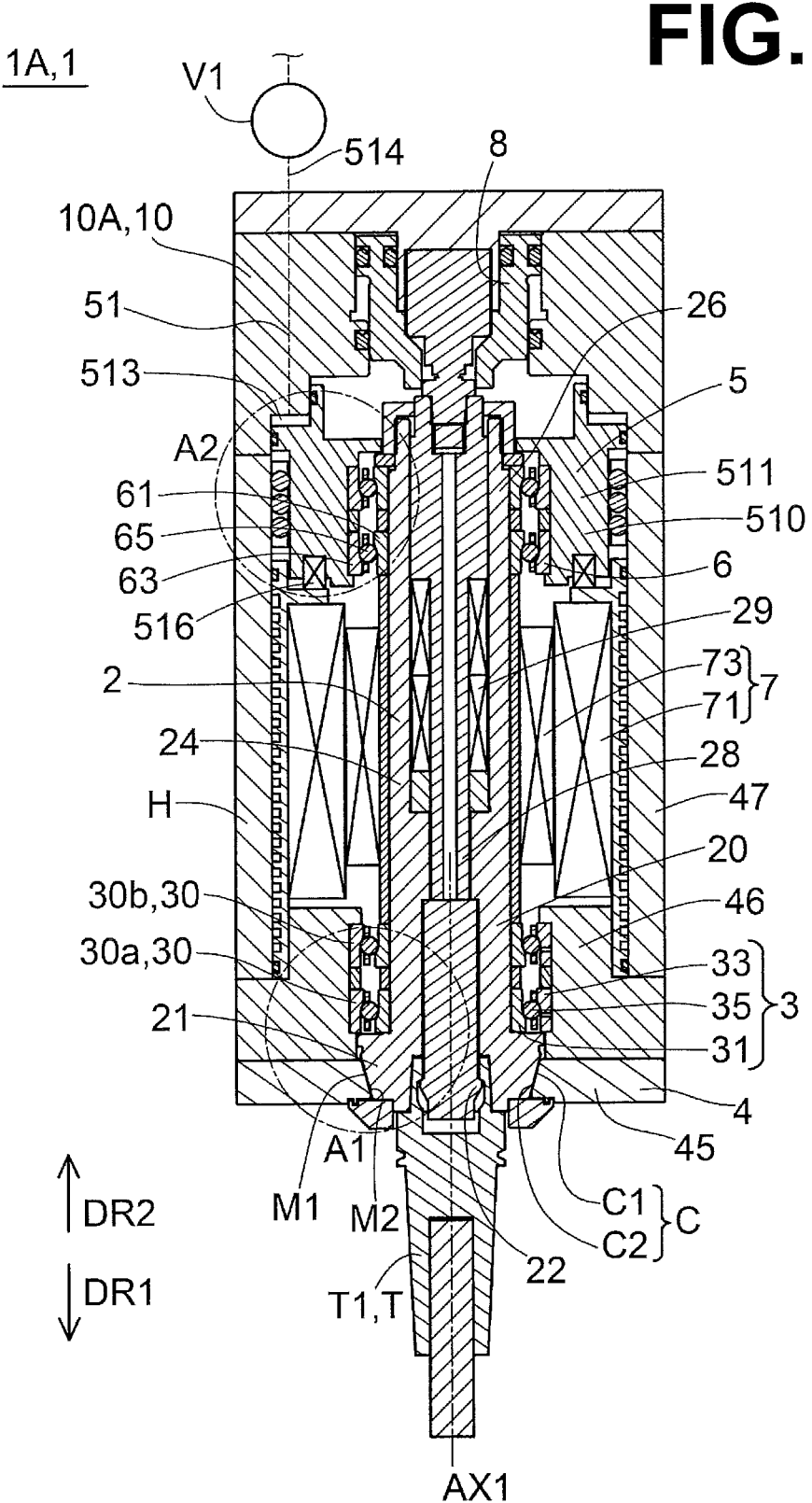
FIG. 5 is a schematic cross-sectional view of the machining head according to the first embodiment.
Figure 6:
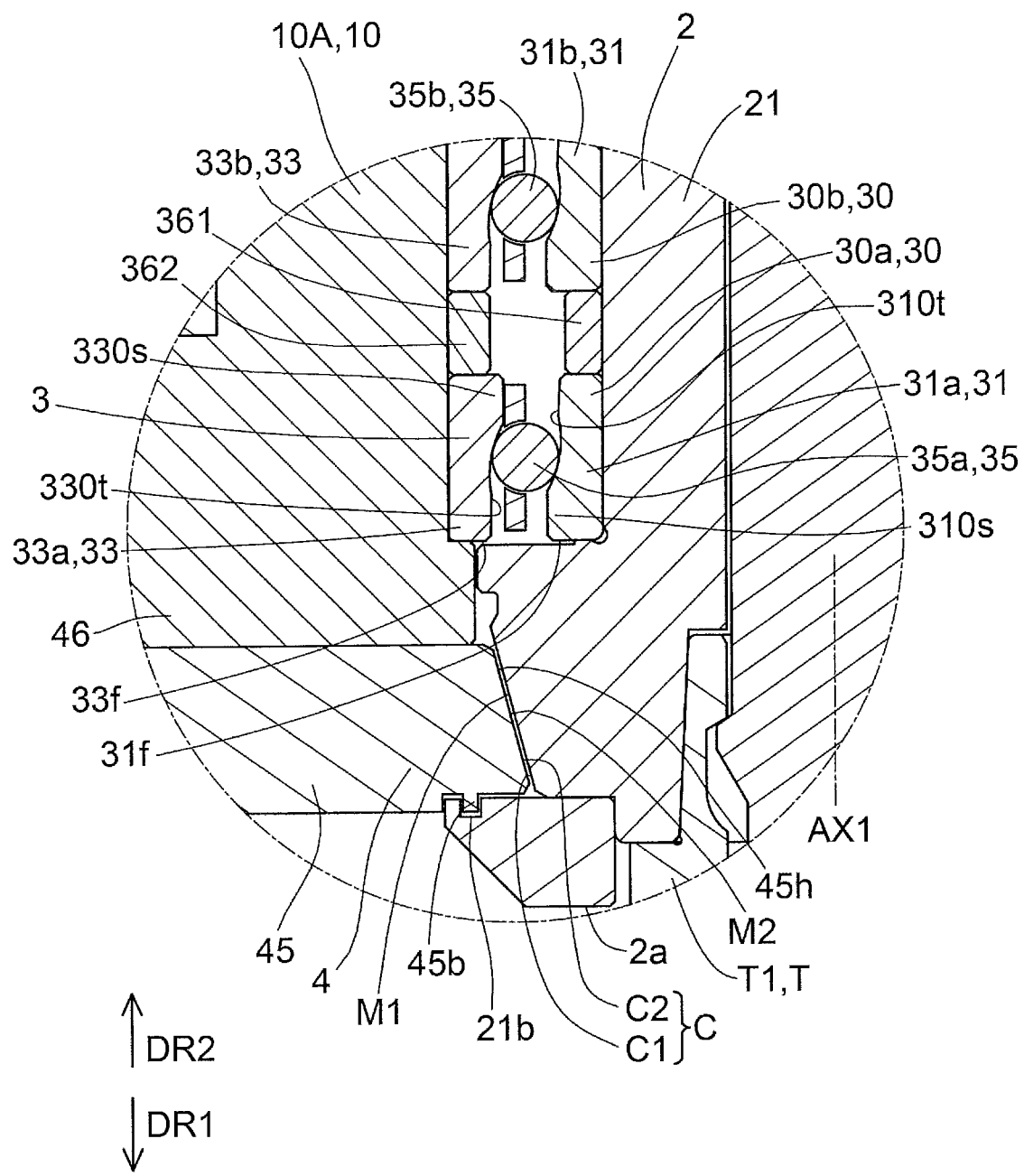
FIG. 6 is an enlarged view of the section indicated by circle A1 in FIG. 5.
Figure 7:
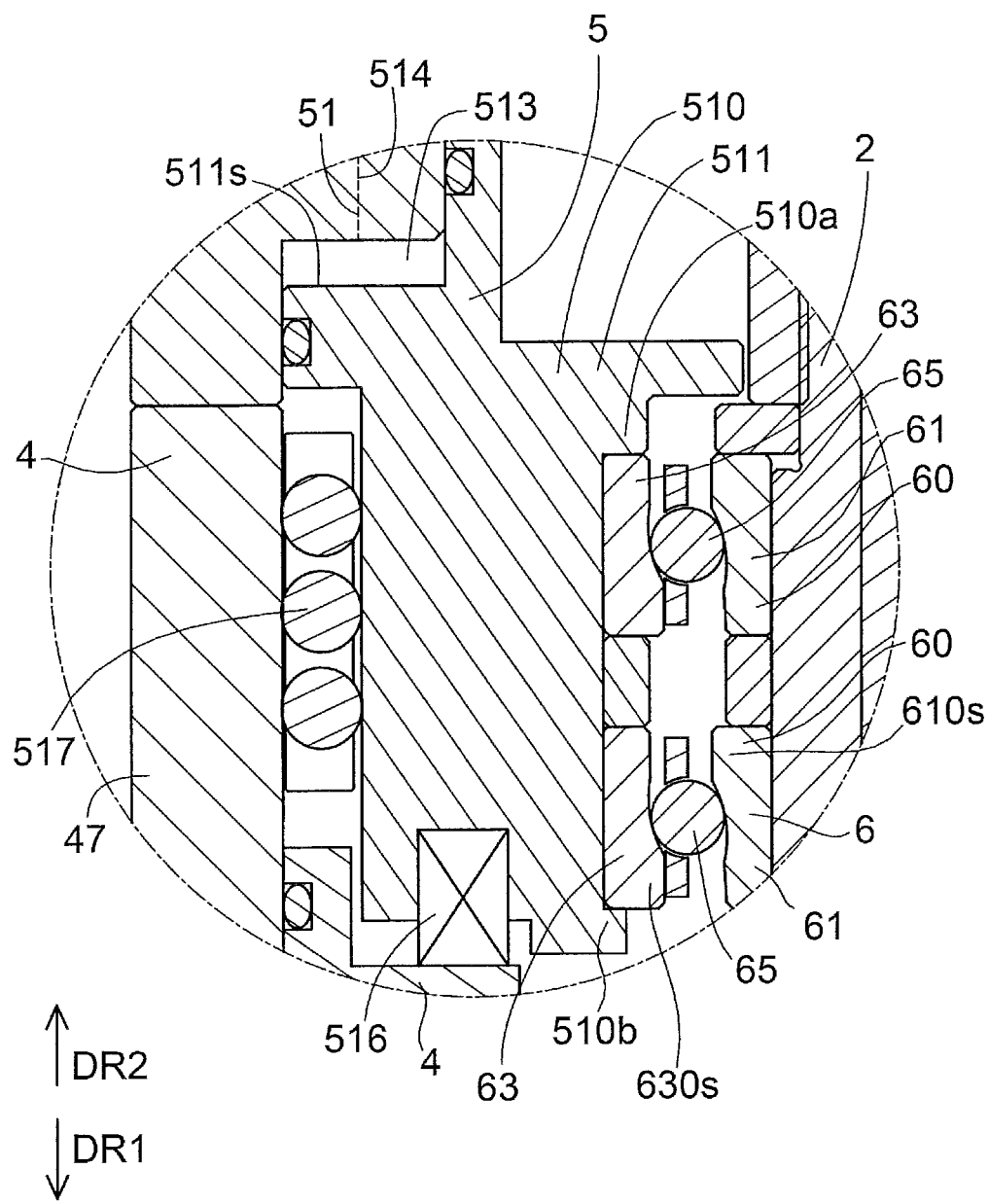
FIG. 7 is an enlarged view of the section indicated by circle A2 in FIG. 5.
Figure 8:
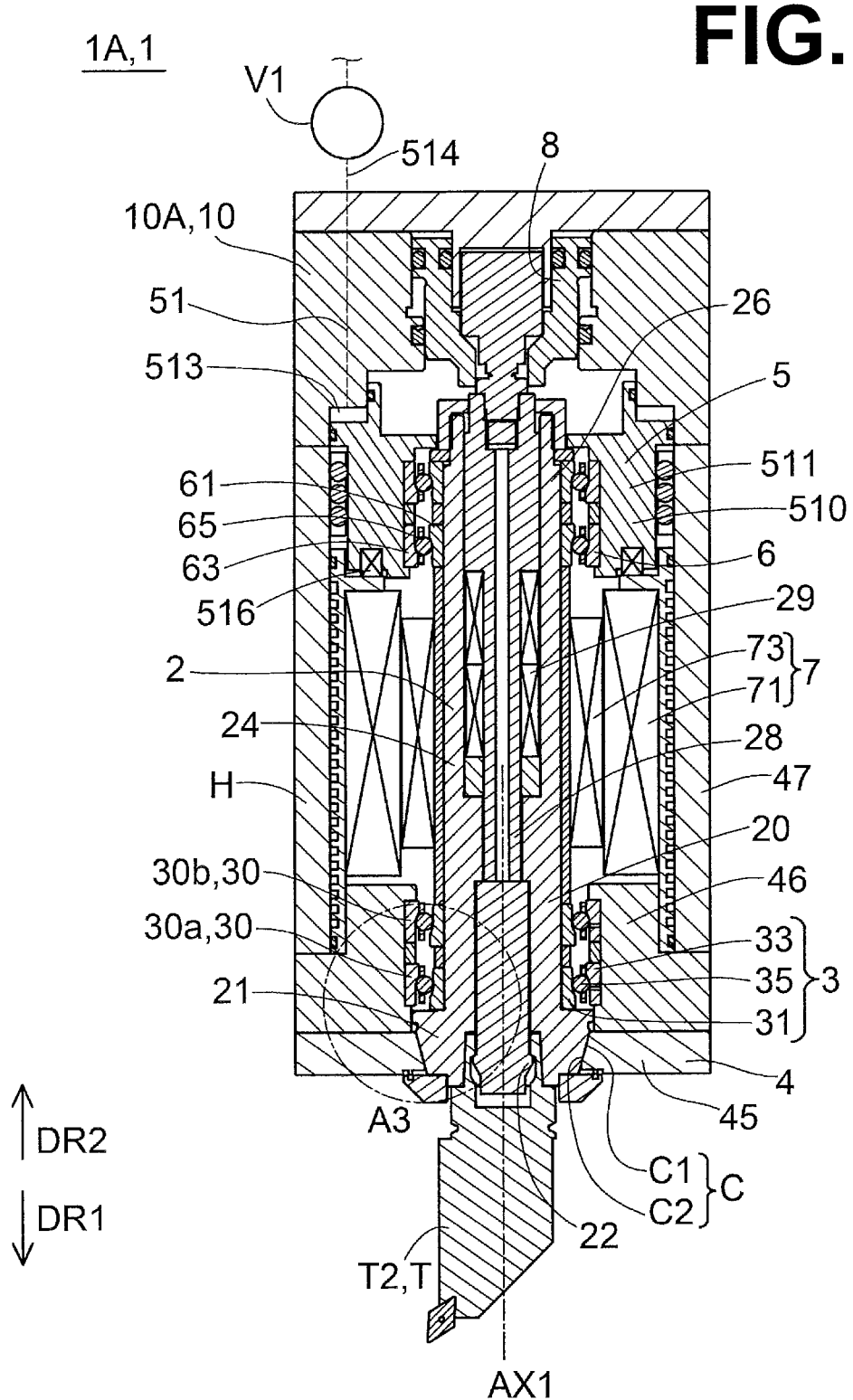
FIG. 8 is a schematic cross-sectional view of the machining head according to the first embodiment.
Figure 9:
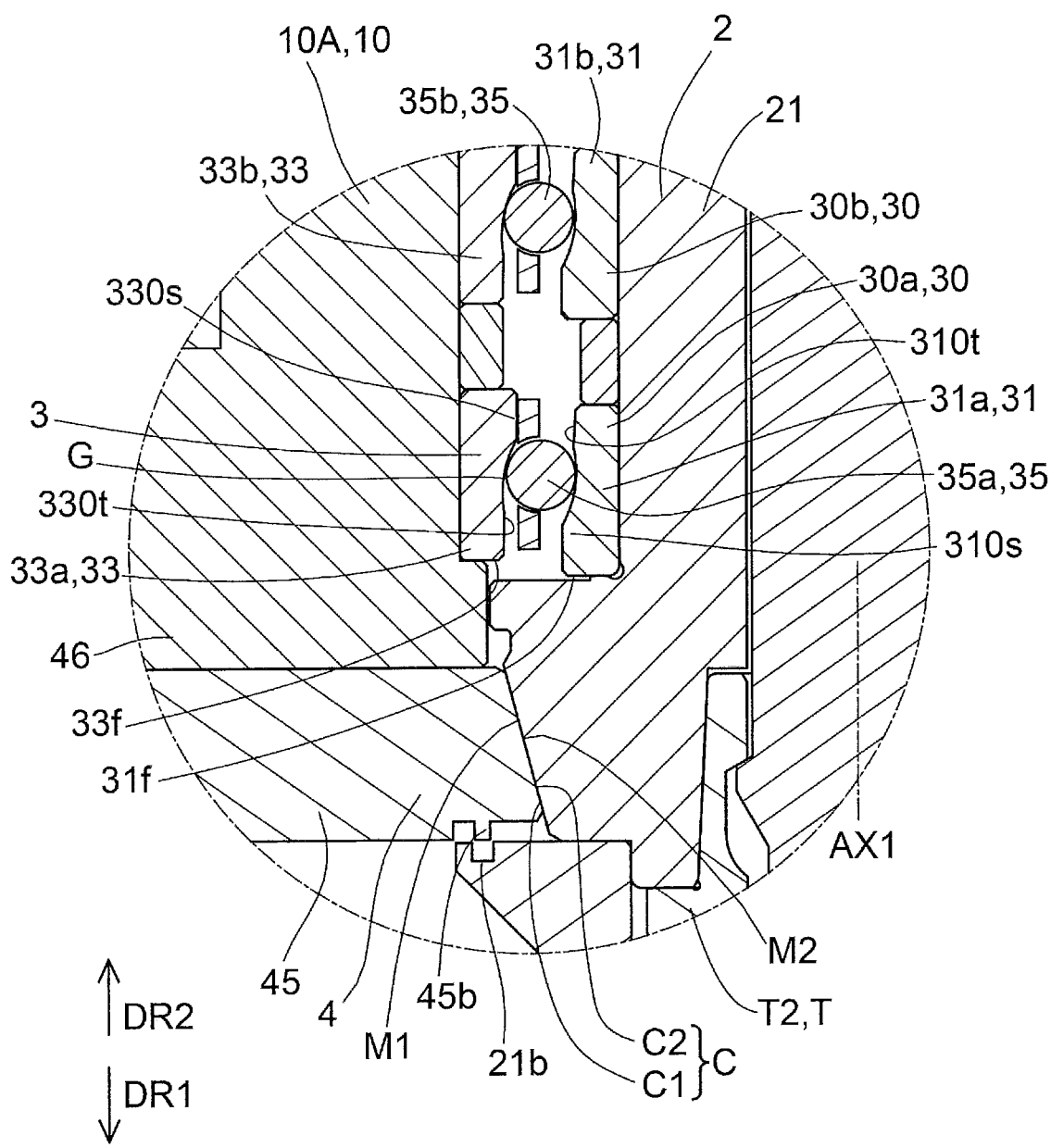
FIG. 9 is an enlarged view of the section indicated by circle A3 in FIG. 8.

A machining head 1A and a rotary shaft locking device 10A according to a first embodiment will be described with reference to FIGS. 1 to 9. FIGS. 1 and 2 are schematic cross-sectional views of part of the machining head 1A according to the first embodiment. Note that FIG. 1 shows a state in which a rotary shaft 2 is rotatable about a first axis AX1, and FIG. 2 shows a state in which the rotation of the rotary shaft 2 is locked. FIG. 3 is an enlarged schematic cross-sectional view of part of a first angular contact ball bearing 3 and the surrounding section. FIG. 4 is a schematic cross-sectional view of the first angular contact ball bearing 3 according to an embodiment. FIG. 5 is a schematic cross-sectional view of the machining head 1A according to the first embodiment. FIG. 6 is an enlarged view of the section indicated by circle A1 drawn with an alternate long and short dash line in FIG. 5. FIG. 7 is an enlarged view of the section indicated by circle A2 drawn with an alternate long and short dash line in FIG. 5. FIG. 8 is a schematic cross-sectional view of the machining head 1A according to the first embodiment. FIG. 9 is an enlarged view of the section indicated by circle A3 drawn with an alternate long and short dash line in FIG. 8. Note that FIGS. 5 and 6 show a state in which the rotary shaft 2 is rotatable about the first axis AX1, and FIGS. 8 and 9 show a state in which the rotation of the rotary shaft 2 is locked.

The machining head 1A according to the first embodiment includes the rotary shaft locking device 10A, which is capable of locking the rotation of the rotary shaft 2, and a housing H, which surrounds the rotary shaft 2. The rotary shaft 2 is rotated by a first rotary drive unit 7 (see FIG. 5 if necessary) of the machining head 1A. The rotation of the rotary shaft 2 is locked by bringing a first contact surface C1 of the rotary shaft 2 into contact with a second contact surface C2 of a support member 4 (see FIG. 2 or FIG. 9 if necessary).

Subsequently, the rotary shaft locking device 10A will be described.

According to the embodiment illustrated in FIG. 1, the rotary shaft locking device 10A includes the rotary shaft 2, the first angular contact ball bearing 3, the support member (an example of a "support") 4, and a drive unit (an example of an "actuator") 5.

The rotary shaft 2 includes a mounting portion 22 on which a tool (such as a milling tool or a lathe tool) will be mounted and the first contact surface C1, which is capable of coming into contact with the second contact surface C2 of the support member 4.

The rotary shaft 2 is rotatable about the first axis AX1. In the embodiment illustrated in FIG. 1, the rotary shaft 2 includes a rotary shaft body 20 and the mounting portion 22, which is located inside the rotary shaft body 20. In the embodiment illustrated in FIG. 1, the rotary shaft 2 is an assembly of a plurality of components.

The rotary shaft 2 includes a distal end portion 21 and a rear end portion. In the embodiment illustrated in FIG. 1, the above-mentioned mounting portion 22 is located on the distal end portion 21 of the rotary shaft 2. The first angular contact ball bearing 3 is also located on the distal end portion 21 of the rotary shaft 2.

The first angular contact ball bearing 3 includes an inner ring 31, an outer ring 33, and a plurality of balls 35 (in other words, a first ball group).

In a state in which the balls 35 receive precompression from the inner ring 31 and the outer ring 33, a straight line that connects a contact point E1 between the inner ring 31 and each ball 35 and a contact point E2 between the outer ring 33 and the ball 35 is inclined with respect to a radial direction DR3 of the first angular contact ball bearing 3. In the embodiment illustrated in FIG. 1, the contact point E1 is located forward of the contact point E2. It should be noted that, in the present description, "forward" means a direction moving from the rear end of the rotary shaft 2 towards the distal end of the rotary shaft 2. Additionally, in the present description, "rearward" means a direction moving from the distal end of the rotary shaft 2 towards the rear end of the rotary shaft 2.

The inner ring 31 is supported by the rotary shaft 2. More specifically, the inner ring 31 is secured to the rotary shaft 2. In the embodiment illustrated in FIG. 1, the inner ring 31 is located around the distal end portion 21 of the rotary shaft 2.

The outer ring 33 is supported by the support member 4. More specifically, the outer ring 33 is secured to the support member 4.

The plurality of balls 35 (in other words, the first ball group) are located between the inner ring 31 and the outer ring 33.

In the embodiment illustrated in FIG. 1, the inner ring 31 is movable relative to the outer ring 33 in the direction parallel to the first axis AX1. When the inner ring 31 moves relative to the outer ring 33 in the direction parallel to the first axis AX1, the precompression that acts on the plurality of balls 35 (in other words, the precompression that the plurality of balls 35 receive from the inner ring 31 and the outer ring 33) changes.

For example, in the embodiment illustrated in FIG. 1, when the inner ring 31 moves relative to the outer ring 33 in a first direction DR1, which is parallel to the first axis AX1, the precompression that the plurality of balls 35 receive from the inner ring 31 and the outer ring 33 is reduced (see FIG. 2). In the embodiment illustrated in FIG. 2, when the inner ring 31 moves relative to the outer ring 33 in a second direction DR2, which is opposite the first direction DR1, the precompression that the plurality of balls 35 receive from the inner ring 31 and the outer ring 33 is increased.

The first angular contact ball bearing 3 may include a plurality of angular contact ball bearing assemblies 30. Each angular contact ball bearing assembly 30 includes the inner ring 31, the outer ring 33, and the plurality of balls 35. In the embodiment illustrated in FIG. 1, the plurality of angular contact ball bearing assemblies 30 are located one next to the other in the direction parallel to the first direction DR1. In the embodiment illustrated in FIG. 1, the first angular contact ball bearing 3 is constituted by the plurality of angular contact ball bearing assemblies 30 located one next to the other in the direction parallel to the first direction DR1. Alternatively, the first angular contact ball bearing 3 may include one angular contact ball bearing assembly 30.

The support member 4 includes the second contact surface C2, which is capable of coming into contact with the first contact surface C1. When the first contact surface C1 of the rotary shaft 2 comes into contact with the second contact surface C2 of the support member 4, the rotation of the rotary shaft 2 about the first axis AX1 is locked (see FIG. 2). When the first contact surface C1 and the second contact surface C2 separate from each other, the rotation of the rotary shaft 2 about the first axis AX1 is permitted (see FIG. 1).

The support member 4 rotatably supports the rotary shaft 2 through the first angular contact ball bearing 3. In the embodiment illustrated in FIG. 1, the support member 4 includes a first end wall 45, which is an end wall on the front side, a first block 46, which supports the first angular contact ball bearing 3, and a side wall 47, which covers at least a middle portion 24 of the rotary shaft 2. In the embodiment illustrated in FIG. 1, the support member 4 is an assembly of a plurality of components.

The drive unit 5 moves the rotary shaft 2 and the inner ring 31 relative to the support member 4 and the outer ring 33 in the direction parallel to the first axis AX1. In the embodiment illustrated in FIG. 1, the rotary shaft 2 and the inner ring 31 are integrally movable relative to the support member 4 and the outer ring 33. The drive unit 5 may be any unit that is capable of moving a certain member relative to another member.

In the embodiment illustrated in FIG. 1, the drive unit 5 is capable of moving the rotary shaft 2 relative to the support member 4 in the first direction DR1 parallel to the first axis AX1 so that the first contact surface C1 comes into contact with the second contact surface C2. When the first contact surface C1 comes into contact with the second contact surface C2, the rotation of the rotary shaft 2 is locked (see FIG. 2).

Additionally, in the embodiment illustrated in FIG. 1, the drive unit 5 is capable of moving the inner ring 31 relative to the outer ring 33 in the first direction DR1 so that the precompression that acts on the plurality of balls 35 (in other words, the precompression that the plurality of balls 35 receive from the inner ring 31 and the outer ring 33) is reduced. In the embodiment illustrated in FIGS. 1 and 2, the drive unit 5 moves the inner ring 31 by moving the rotary shaft 2, which supports the inner ring 31.

In the embodiment illustrated in FIG. 1, the drive unit 5 is capable of switching from an unlocked state in which the rotation of the rotary shaft 2 is permitted (more specifically, the state in which the first contact surface C1 is separate from the second contact surface C2) to a locked state in which the rotation of the rotary shaft 2 is locked (more specifically, the state in which the first contact surface C1 is in contact with the second contact surface C2) by moving the rotary shaft 2 and the inner ring 31 relative to the support member 4 and the outer ring 33 in the first direction DR1. First precompression that acts on the plurality of balls 35 (in other words, the first precompression that the plurality of balls 35 receive from the inner ring 31 and the outer ring 33) in the locked state is smaller than second precompression that acts on the plurality of balls 35 (in other words, the second precompression that the plurality of balls 35 receive from the inner ring 31 and the outer ring 33) in the unlocked state. The first precompression may be approximately zero.

It should be noted that, in the present description, the "unlocked state" means the state in which the rotary shaft 2 is rotatable about the first axis AX1, and the "locked state" means the state in which the rotary shaft 2 cannot rotate about the first axis AX1.

According to the rotary shaft locking device 10A of the first embodiment and the machining head 1A of the first embodiment, the drive unit 5 moves the rotary shaft 2 and the inner ring 31 relative to the support member 4 and the outer ring 33 in the first direction DR1. This locks the rotation of the rotary shaft 2 and also reduces the precompression that acts on the plurality of balls 35. In this manner, in the state in which the rotation of the rotary shaft 2 is locked, the load that acts on the plurality of balls 35 of the first angular contact ball bearing 3 is reduced.

Furthermore, moving the rotary shaft 2 and the inner ring 31 relative to the support member 4 and the outer ring 33 in the first direction DR1 may form a gap G (see FIG. 2) that permits each of the plurality of balls 35 to move relative to the inner ring 31 and the outer ring 33 in any direction (in other words, all directions).

FIG. 3 shows the state in which one of the plurality of balls 35 (hereinafter, referred to as a "first ball 35-1") is made movable relative to the inner ring 31 and the outer ring 33 in any direction by moving the rotary shaft 2 and the inner ring 31 relative to the support member 4 and the outer ring 33 in the first direction DR1. In FIG. 3, an imaginary spherical surface Q (refer to a circle drawn with an alternate long and short dash line in FIG. 3), which is in contact with both an outer surface 31n of the inner ring 31 (more specifically, a first curved surface 31c, which will be described later) and an inner surface 33n of the outer ring 33 (more specifically, a second curved surface 33c, which will be described later), is greater than the diameter of the first ball 35-1. In this case, a gap formed inward of the imaginary spherical surface Q functions as the gap G, which permits the first ball 35-1 to move relative to the inner ring 31 and the outer ring 33 in any direction (in other words, all directions). The gap G is formed for each of the plurality of balls 35. It will be readily understood that the shape of the gap G formed for each ball 35 is not limited to a sphere.

The fact that the movement of each of the plurality of balls 35 is permitted in the state in which the rotation of the rotary shaft 2 is locked means that the load that acts on the plurality of balls 35 from the inner ring 31 of the first angular contact ball bearing 3 is not transmitted to the outer ring 33. More specifically, in the state in which the rotation of the rotary shaft 2 is locked, the load that acts on the plurality of balls 35 from the inner ring 31 of the first angular contact ball bearing 3 in the axial direction (in other words, the load in the second direction DR2) is not transmitted to the outer ring 33, and the load that acts on the plurality of balls 35 from the inner ring 31 of the first angular contact ball bearing 3 in the radial direction (in other words, the load in the direction perpendicular to the second direction DR2) is not transmitted to the outer ring 33.

For example, assume a case in which a workpiece is turned using a lathe tool mounted on the mounting portion 22 of the rotary shaft 2 with the rotation of the rotary shaft 2 locked (see FIG. 2). In this case, due to the vibration of the rotary shaft 2, fretting (in other words, wearing out of the contact surface due to slight vibration) is likely to occur on the contact surfaces between the plurality of balls 35 and the rings (31 and 33). In contrast, according to the first embodiment, the above-mentioned fretting is inhibited or reduced since the precompression that acts on the plurality of balls 35 is reduced in the state in which the rotation of the rotary shaft 2 is locked. Typically, the above-mentioned fretting is further inhibited or reduced since the load that acts on the plurality of balls 35 from the inner ring 31 is not transmitted to the outer ring 33. Inhibiting or reducing the fretting prolongs the durability life of the rotary shaft 2 and improves the reliability of the device including the rotary shaft 2. Since the fretting of the contact surfaces between the plurality of balls 35 and the rings (31 and 33) is kept inhibited or reduced, the rotary shaft 2 is permitted to rotate about the first axis AX1 at high speed. In other words, the durability life of the rotary shaft 2 is sufficiently maintained even when the rotary shaft 2 is used in high-speed rotation.

In the embodiment illustrated in FIG. 4, oil exists in the space SP between the inner ring 31 and the outer ring 33. The oil is supplied from, for example, an oil supply hole 33h located in the first angular contact ball bearing 3 (more specifically, the outer ring 33). Alternatively or additionally, grease may be sealed in the space SP between the inner ring 31 and the outer ring 33.

In the state in which the rotation of the rotary shaft 2 is locked, the inner ring 31 does not rotate relative to the outer ring 33. At this time, if great precompression acts on the balls 35 from the inner ring 31 and the outer ring 33, an oil film is not sufficiently formed around the balls 35. However, in the embodiment illustrated in FIG. 2, the precompression that acts on the balls 35 is reduced in the state in which the rotation of the rotary shaft 2 is locked. Thus, the oil effectively protects the circumference of the balls 35. Since the oil protects the circumference of the balls 35, fretting is further effectively inhibited from occurring on the contact surfaces between the balls 35 and the rings (31 and 33).

Optional Structures

Subsequently, optional structures that can be employed by the rotary shaft locking device 10A according to the first embodiment or the machining head 1A according to the first embodiment will be described with reference to FIGS. 1 to 9.

Unlocking of Rotary Shaft 2

In the embodiment illustrated in FIG. 2, the drive unit 5 moves the rotary shaft 2 relative to the support member 4 in the second direction DR2, which is opposite to the first direction DR1, so that the first contact surface C1 of the rotary shaft 2 separates from the second contact surface C2 of the support member 4 (see FIG. 1). This unlocks the rotary shaft 2. Additionally, the drive unit 5 moves the inner ring 31 relative to the outer ring 33 in the second direction DR2, so that the precompression that acts on the plurality of balls 35 is increased (see FIG. 1). In the embodiment illustrated in FIGS. 1 and 2, the drive unit 5 moves the inner ring 31 by moving the rotary shaft 2, which supports the inner ring 31.

In the embodiment illustrated in FIG. 2, the drive unit 5 is capable of switching the state of the rotary shaft 2 from the locked state (see FIG. 2) to the unlocked state (see FIG. 1) by moving the rotary shaft 2 and the inner ring 31 relative to the support member 4 and the outer ring 33 in the second direction DR2. The second precompression that acts on the plurality of balls 35 in the unlocked state is greater than the first precompression that acts on the plurality of balls 35 in the locked state.

In the embodiment illustrated in FIG. 2, the drive unit 5 moves the rotary shaft 2 and the inner ring 31 relative to the support member 4 and the outer ring 33 in the second direction DR2 to unlock the rotary shaft 2 and also to increase the precompression that acts on the plurality of balls 35. Thus, in the unlocked state in which the rotation of the rotary shaft 2 is permitted, the axial load that acts on the rotary shaft 2 is supported by the first angular contact ball bearing 3 in a suitable manner.

For example, assume a case in which a workpiece is machined using a milling tool mounted on the mounting portion of the rotary shaft 2 by rotating the rotary shaft 2 about the first axis AX1 in the unlocked state (see FIG. 1). In this case, the axial load that acts on the rotary shaft 2 from the milling tool is supported by the first angular contact ball bearing 3 in a suitable manner.

First Angular Contact Ball Bearing 3

In the embodiment illustrated in FIG. 4, the first angular contact ball bearing 3 includes the inner ring 31, the outer ring 33, and the plurality of balls 35. The first angular contact ball bearing 3 may include a retainer 37 (more specifically, a ring-shaped retainer), which keeps the gap between two adjacent balls 35. The retainer 37 includes a plurality of through-holes 37h, which receive the plurality of balls 35, respectively.

In the embodiment illustrated in FIG. 4, the inner ring 31 includes a first shoulder portion 310s, and the outer ring 33 includes a second shoulder portion 330s. In the embodiment illustrated in FIG. 4, when the inner ring 31 moves relative to the outer ring 33 in the first direction DR1, the first shoulder portion 310s moves in the direction away from the second shoulder portion 330s. When the first shoulder portion 310s moves in the direction away from the second shoulder portion 330s, the precompression that acts on the plurality of balls 35 (in other words, the precompression that the plurality of balls 35 receive from the first shoulder portion 310s and the second shoulder portion 330s) is reduced.

In the embodiment illustrated in FIG. 4, the rear surface of the first shoulder portion 310s includes a first curved surface 31c, which applies diagonally rearward precompression on the plurality of balls 35, and the front surface of the second shoulder portion 330s includes a second curved surface 33c, which applies diagonally forward precompression on the plurality of balls 35. When the inner ring 31 moves relative to the outer ring 33 in the first direction DR1, the first curved surface 31c moves in the direction away from the second curved surface 33c.

In the embodiment illustrated in FIG. 1, the first angular contact ball bearing 3 has a frontal arrangement in which the first angular contact ball bearing 3 supports the axial load that acts in the direction from the distal end of the rotary shaft 2 to the rear end of the rotary shaft 2. It should be noted that in the present description, the "frontal arrangement" means the arrangement that is capable of supporting the axial load that acts in the direction from the distal end of the rotary shaft 2 to the rear end of the rotary shaft 2. Typically, in the first angular contact ball bearing 3 having the frontal arrangement, the first shoulder portion 310s of the inner ring 31 is located forward of the second shoulder portion 330s of the outer ring 33.

In the embodiment illustrated in FIG. 5, the first angular contact ball bearing 3 includes a first angular contact ball bearing assembly 30a, which is a first bearing unit. The first angular contact ball bearing assembly 30a has the frontal arrangement in which the first angular contact ball bearing assembly 30a supports the axial load that acts in the direction from the distal end of the rotary shaft 2 to the rear end of the rotary shaft 2.

In the embodiment illustrated in FIG. 6, the first angular contact ball bearing assembly 30a includes an inner ring 31a, an outer ring 33a, and a plurality of balls 35a located between the inner ring 31a and the outer ring 33a.

The inner ring 31a of the first angular contact ball bearing assembly 30a includes the first shoulder portion 310s, and the outer ring 33a includes a counter bore 330t (in other words, a shoulderless portion), which faces the first shoulder portion 310s. The outer ring 33a of the first angular contact ball bearing assembly 30a includes the second shoulder portion 330s, and the inner ring 31a includes a counter bore 310t (in other words, a shoulderless portion), which faces the second shoulder portion 330s.

In the embodiment illustrated in FIG. 5, the first angular contact ball bearing 3 includes a second angular contact ball bearing assembly 30b, which is a second bearing unit. The second angular contact ball bearing assembly 30b is located further in the second direction DR2 than the first angular contact ball bearing assembly 30a. The second angular contact ball bearing assembly 30b has the frontal arrangement in which the second angular contact ball bearing assembly 30b supports the axial load that acts in the direction from the distal end of the rotary shaft 2 to the rear end of the rotary shaft 2.

In the embodiment illustrated in FIG. 6, the second angular contact ball bearing assembly 30b includes an inner ring 31b, an outer ring 33b, and a plurality of balls 35b, which are located between the inner ring 31b and the outer ring 33b.

In the embodiment illustrated in FIG. 6, the first angular contact ball bearing assembly 30a located on the distal end portion 21 of the rotary shaft 2 has the frontal arrangement, and the second angular contact ball bearing assembly 30b located on the distal end portion 21 of the rotary shaft 2 has the frontal arrangement. In this case, the drive unit 5 is capable of moving the rotary shaft 2, the inner ring 31a of the first angular contact ball bearing assembly 30a, and the inner ring 31b of the second angular contact ball bearing assembly 30b relative to the support member 4, the outer ring 33a of the first angular contact ball bearing assembly 30a, and the outer ring 33b of the second angular contact ball bearing assembly 30b in the first direction DR1. Such relative movement causes the first contact surface C1 to come into contact with the second contact surface C2 with the precompression that acts on the plurality of balls (35a and 35b) reduced (typically, with each of the plurality of balls 35 allowed to move relative to the outer ring 33 and the inner ring 31 in any direction).

In the embodiment illustrated in FIG. 6, the first angular contact ball bearing 3 located on the distal end portion 21 of the rotary shaft 2 includes two angular contact ball bearing assemblies (30a and 30b), which have the frontal arrangement. Alternatively, the first angular contact ball bearing 3, which is located on the distal end portion 21 of the rotary shaft 2, may include three or more angular contact ball bearing assemblies having the frontal arrangement.

In the embodiment illustrated in FIG. 6, a first spacer 361 is located between the inner ring 31a of the first angular contact ball bearing assembly 30a and the inner ring 31b of the second angular contact ball bearing assembly 30b. The first spacer 361 maintains the gap between the inner ring 31a and the inner ring 31b. Additionally, a second spacer 362 is located between the outer ring 33a of the first angular contact ball bearing assembly 30a and the outer ring 33b of the second angular contact ball bearing assembly 30b. The second spacer 362 maintains the gap between the outer ring 33a and the outer ring 33b. Note that these spacers (361 and 362) may be omitted.

Tool T Mounted on Mounting Portion 22 of Rotary Shaft 2

In the embodiment illustrated in FIG. 5, in the state in which the rotation of the rotary shaft 2 is permitted, a milling tool T1 is mounted on the mounting portion 22 of the rotary shaft 2. In the embodiment illustrated in FIG. 8, in the state in which the rotation of the rotary shaft 2 is locked, a lathe tool T2 is mounted on the mounting portion 22 of the rotary shaft 2. Changing the milling tool T1 to the lathe tool T2 or changing the lathe tool T2 to the milling tool T1 is performed using, for example, an automatic tool exchanger.

Drive Unit 5

In the embodiment illustrated in FIG. 5, the drive unit 5 moves the rotary shaft 2 and the inner ring 31 relative to the support member 4 and the outer ring 33 in the first direction DR1. The first direction DR1 is the direction moving from a rear end portion 26 of the rotary shaft 2 towards the distal end portion 21 of the rotary shaft 2. In the embodiment illustrated in FIG. 8, the drive unit 5 moves the rotary shaft 2 and the inner ring 31 relative to the support member 4 and the outer ring 33 in the second direction DR2. The second direction DR2 is the direction moving from the distal end portion 21 of the rotary shaft 2 to the rear end portion 26 of the rotary shaft 2.

In the embodiment illustrated in FIG. 5, the drive unit 5 includes a first movable member 510, which directly or indirectly presses the rotary shaft 2. The first movable member 510 is capable of pressing the rotary shaft 2 in the first direction DR1. The first movable member 510 is also capable of pressing the rotary shaft 2 in the second direction DR2.

In the embodiment illustrated in FIG. 5, the first movable member 510 is located rearward of (more specifically, further in the second direction DR2 than) the first angular contact ball bearing 3.

With the first movable member 510 located rearward of the first angular contact ball bearing 3, the structure forward of the first angular contact ball bearing 3 is simplified. As a result, the distance between the distal end of the rotary shaft 2 and the first angular contact ball bearing 3 is reduced. The reduction in the distance between the distal end of the rotary shaft 2 and the first angular contact ball bearing 3 improves the radial stiffness of the rotary shaft 2. In this case, the milling tool T1 mounted on the rotary shaft 2 is rotated about the first axis AX1 in a stable manner.

In the embodiment illustrated in FIG. 5, the drive unit 5 includes a first drive unit (an example of a "first actuator") 51, which moves the first movable member 510. In the embodiment illustrated in FIG. 5, the first drive unit 51 includes a first oil chamber 513 and a first pipe 514, which supplies oil to the first oil chamber 513. The first drive unit 51 may include a first valve V1, which controls the flow direction of the oil in the first pipe 514.

In the embodiment illustrated in FIG. 5, when the oil is supplied from the first pipe 514 to the first oil chamber 513, the first movable member 510 moves in the first direction DR1. When the first movable member 510 moves in the first direction DR1, the first movable member 510 presses the rotary shaft 2 in the first direction DR1. In the embodiment illustrated in FIG. 5, the first movable member 510 includes a first piston 511, which is hydraulically driven. The first movable member 510 may be constituted by one component, or may be constituted by an assembly of a plurality of components.

In the embodiment illustrated in FIG. 5, the first movable member 510 presses the rotary shaft 2 through a second angular contact ball bearing 6, which is located on the rear end portion 26 of the rotary shaft 2. Alternatively, the first movable member 510 may directly press the rotary shaft 2.

In the embodiment illustrated in FIG. 7, the movable member 510 includes a first pressing portion 510a and a second pressing portion 510b. In the embodiment illustrated in FIG. 7, when the first movable member 510 moves in the first direction DR1, the first pressing portion 510a of the first movable member 510 presses the rotary shaft 2 in the first direction DR1 through the second angular contact ball bearing 6. In contrast, when the first movable member 510 moves in the second direction DR2, the second pressing portion 510b of the first movable member 510 presses the rotary shaft 2 in the second direction DR2 through the second angular contact ball bearing 6.

In the embodiment illustrated in FIG. 7, the first movable member 510 (more specifically, the first piston 511) includes a pressure receiving surface 511s, which receives the hydraulic pressure. In the embodiment illustrated in FIG. 7, the first drive unit 51 includes a plurality of rolling elements 517, which are located around the first movable member 510 and guide the movement of the first movable member 510. The plurality of rolling elements 517 are located between the outer circumferential surface of the first movable member 510 and the inner circumferential surface of the support member 4.

In the embodiment illustrated in FIG. 7, the first drive unit 51 includes a first urging member 516 (for example, a spring), which applies an urging force to the first movable member 510. The first urging member 516 urges the first movable member 510 in the second direction DR2. In the embodiment illustrated in FIG. 7, the first urging member 516 is located between the first movable member 510 and the support member 4. In the embodiment illustrated in FIG. 7, when the oil is discharged from the first oil chamber 513 through the first pipe 514, the first movable member 510 moves in the second direction DR2 by the urging force of the first urging member 516. When the first movable member 510 moves in the second direction DR2, the first movable member 510 presses the rotary shaft 2 in the second direction DR2.

In the embodiment illustrated in FIG. 8, the first movable member 510, which receives an urging force from the first urging member 516, moves the rotary shaft 2 and the inner ring 31 relative to the support member 4 and the outer ring 33 in the second direction DR2 so that the first contact surface C1 of the rotary shaft 2 separates from the second contact surface C2 of the support member 4 and so that the precompression that acts on the plurality of balls 35 of the first angular contact ball bearing 3 is increased. This unlocks the rotary shaft 2.

The first urging member 516 applies an urging force to the first movable member 510, the rotary shaft 2, and the inner ring 31 in the second direction DR2 (in other words, the direction opposite to the first direction DR1). In the embodiment illustrated in FIG. 5, in the unlocked state in which the rotation of the rotary shaft 2 is permitted, the plurality of balls 35 receive, from the inner ring 31, the precompression that corresponds to the amount of the urging force applied by the first urging member 516. The drive unit 5 moves the rotary shaft 2 and the inner ring 31 relative to the support member 4 and the outer ring 33 in the first direction DR1 against the urging force of the first urging member 516, so that the precompression that acts on the plurality of balls 35 is reduced.

Second Angular Contact Ball Bearing 6

In the embodiment illustrated in FIG. 5, the rotary shaft locking device 10A includes the second angular contact ball bearing 6, which is located on the rear end portion 26 of the rotary shaft 2. In the embodiment illustrated in FIG. 5, the second angular contact ball bearing 6 includes a second inner ring 61, a second outer ring 63, and a plurality of balls 65 (in other words, a second ball group).

The second inner ring 61 is supported by the rotary shaft 2. More specifically, the second inner ring 61 is secured to the rotary shaft 2. In the embodiment illustrated in FIG. 5, the second inner ring 61 is located around the rear end portion 26 of the rotary shaft 2.

In the embodiment illustrated in FIG. 5, the second outer ring 63 is supported by the first movable member 510. More specifically, the second outer ring 63 is secured to the first movable member 510.

The plurality of balls 65 (in other words, the second ball group) are located between the second inner ring 61 and the second outer ring 63.

As illustrated in FIG. 7, the second angular contact ball bearing 6 may include a plurality of angular contact ball bearing assemblies 60. Each angular contact ball bearing assembly 60 includes the second inner ring 61, the second outer ring 63, and the plurality of balls 65. In the embodiment illustrated in FIG. 7, the second angular contact ball bearing 6 is constituted by the plurality of angular contact ball bearing assemblies 60 located one next to the other in the direction parallel to the first direction DR1. Alternatively, the second angular contact ball bearing 6 may include one angular contact ball bearing assembly 60.

In the embodiment illustrated in FIG. 7, the second angular contact ball bearing 6 has a back arrangement in which the second angular contact ball bearing 6 supports the axial load that acts in the direction from the rear end of the rotary shaft 2 to the distal end of the rotary shaft 2 (in other words, the axial load in the first direction DR1). In the second embodiment to a fifth embodiment described below also, the second angular contact ball bearing 6 located on the rear end portion 26 of the rotary shaft 2 preferably has the back arrangement. It should be noted that in the present description, the "back arrangement" means the arrangement that is capable of supporting the axial load that acts in the direction from the rear end of the rotary shaft 2 to the distal end of the rotary shaft 2.

Typically, in the second angular contact ball bearing 6 having the back arrangement, a third shoulder portion 610s of the second inner ring 61 is located rearward of a fourth shoulder portion 630s of the second outer ring 63. When the plurality of balls 65 of the second angular contact ball bearing 6 are sandwiched between the third shoulder portion 610s and the fourth shoulder portion 630s, precompression acts on the plurality of balls 65.

In the embodiment illustrated in FIG. 7, when the rotary shaft 2 moves in the direction parallel to the first direction DR1, the second inner ring 61 of the second angular contact ball bearing 6 and the second outer ring 63 of the second angular contact ball bearing 6 move in the direction parallel to the first direction DR1 together with the rotary shaft 2. In other words, when the rotary shaft 2 moves in the direction parallel to the first direction DR1, the entire second angular contact ball bearing 6 moves in the direction parallel to the first direction DR1 together with the rotary shaft 2. This is contrasting to the fact that the outer ring 33 of the first angular contact ball bearing 3 does not move in the direction parallel to the first direction DR1 when the rotary shaft 2 moves in the direction parallel to the first direction DR1.

As described above, in the embodiment illustrated in FIG. 5, the drive unit 5 is capable of moving the entire second angular contact ball bearing 6, the rotary shaft 2, and the inner ring 31 of the first angular contact ball bearing 3 relative to the support member 4 and the outer ring 33 of the first angular contact ball bearing 3 in the first direction DR1.

In the embodiment illustrated in FIG. 5, when the drive unit 5 switches the state of the rotary shaft 2 from the unlocked state to the locked state, the precompression that acts on the plurality of balls 35 (in other words, the first ball group) is reduced. Meanwhile, when the drive unit 5 switches the state of the rotary shaft 2 from the unlocked state to the locked state, the precompression that acts on the plurality of balls 65 (in other words, the second ball group) may be reduced or approximately maintained.

Front End Face 31f of Inner Ring 31 and Front End Face 33f of Outer Ring 33

In the embodiment illustrated in FIG. 9, in the state in which the rotation of the rotary shaft 2 is locked, a front end face 31f of the inner ring 31 is located forward of (in other words, further in the first direction DR1 than) a front end face 33f of the outer ring 33. By contrast, in the embodiment illustrated in FIG. 6, in the state in which the rotation of the rotary shaft 2 is permitted, the position of the front end face 31f of the inner ring 31 in the direction of the first axis AX1 is approximately aligned with the position of the front end face 33f of the outer ring 33 in the direction of the first axis AX1.

First Rotary Drive Unit 7

In the embodiment illustrated in FIG. 5, the machining head 1A includes the first rotary drive unit 7, which rotates the rotary shaft 2 about the first axis AX1. The first rotary drive unit 7 may be a first motor. In the embodiment illustrated in FIG. 5, the first rotary drive unit 7 (more specifically, the first motor) includes a stator 71 and a rotor 73. In this case, when current is supplied to the stator 71, the rotor 73 rotates about the first axis AX1 by electromagnetic action. In the embodiment illustrated in FIG. 5, the stator 71 is secured to the support member 4, and the rotor 73 is secured to the rotary shaft 2.

In the embodiment illustrated in FIG. 5, the rotor 73 is located on the middle portion 24 of the rotary shaft 2. In the embodiment illustrated in FIG. 5, the rotor 73 is located rearward of the first angular contact ball bearing 3 and forward of the second angular contact ball bearing 6.

In the embodiment illustrated in FIG. 5, the first movable member 510, which presses the rotary shaft 2, is located rearward of the stator 71. Alternatively, the first movable member 510, which presses the rotary shaft 2, may be located forward of the stator 71. In this case, the first movable member 510 directly presses the rotary shaft 2 without the second angular contact ball bearing 6.

Locking Mechanism C that Locks Rotation of Rotary Shaft 2

In the embodiment illustrated in FIG. 6, the rotary shaft locking device 10A includes a locking mechanism C that locks the rotation of the rotary shaft 2. In the embodiment illustrated in FIG. 6, the locking mechanism C includes the first contact surface C1 of the rotary shaft 2 and the second contact surface C2 of the support member 4. The first contact surface C1 includes a first inclined surface M1, which is inclined with respect to the first axis AX1, and the second contact surface C2 includes a second inclined surface M2, which is inclined with respect to the first axis AX1.

In the embodiment illustrated in FIG. 9, the state in which the first inclined surface M1 and the second inclined surface M2 are in contact with each other corresponds to the locked state. In the embodiment illustrated in FIG. 6, the state in which the first inclined surface M1 and the second inclined surface M2 are separate from each other corresponds to the unlocked state.

In the embodiment illustrated in FIG. 5, when the drive unit 5 moves the rotary shaft 2 in the first direction DR1, the inner ring 31 moves relative to the outer ring 33 so that the precompression that acts on the plurality of balls 35 is reduced, and the first inclined surface M1 presses the second inclined surface M2. This locks the rotary shaft 2.

In the embodiment illustrated in FIG. 8, when the drive unit 5 moves the rotary shaft 2 in the second direction DR2, the inner ring 31 moves relative to the outer ring 33 so that the precompression that acts on the plurality of balls 35 is increased, and the first inclined surface M1 separates from the second inclined surface M2. This unlocks the rotary shaft 2.

In the embodiment illustrated in FIG. 6, the first inclined surface M1 and the second inclined surface M2 are located forward of (in other words, further in the first direction DR1 than) the first angular contact ball bearing 3.

In the embodiment illustrated in FIG. 6, the first inclined surface M1 is an annular inclined surface formed on the outer circumferential surface of the rotary shaft 2. In the embodiment illustrated in FIG. 6, the outer diameter of the first inclined surface M1 is reduced toward the front (in other words, toward the distal end 2a of the rotary shaft 2).

In the embodiment illustrated in FIG. 6, the second inclined surface M2 is an annular inclined surface formed on the inner circumferential surface of the support member 4. The second inclined surface M2 is located on the first end wall 45 of the support member 4. In the embodiment illustrated in FIG. 6, the inner diameter of the second inclined surface M2 is reduced toward the front (in other words, toward the distal end 2a of the rotary shaft 2).

Rotary Shaft 2

In the embodiment illustrated in FIG. 5, the rotary shaft 2 includes the rotary shaft body 20, the mounting portion 22 on which a tool T is mounted, and a rod-like member 28, which is coupled to the mounting portion 22. In the embodiment illustrated in FIG. 5, when a mounting portion drive unit 8 of the machining head 1A presses the rod-like member 28 in the first direction DR1, the rod-like member 28 and the mounting portion 22 move relative to the rotary shaft body 20 in the first direction DR1. In this state, the tool T mounted on the mounting portion 22 can be changed to another tool. After the tool is changed, an urging member 29 (for example, a disc spring) located on the rotary shaft 2 presses the rod-like member 28 in the second direction DR2. In this manner, the rod-like member 28 and the mounting portion 22 move relative to the rotary shaft body 20 in the second direction DR2.

In the embodiment illustrated in FIG. 6, the distal end portion 21 of the rotary shaft 2 includes a recessed portion 21b, which faces a projecting portion 45b formed on the first end wall 45 of the support member 4. The recessed portion 21b and the projecting portion 45b form a labyrinth structure that prevents the entry of liquid. The gap between the recessed portion 21b and the projecting portion 45b increases when the rotary shaft 2 moves relative to the support member 4 in the first direction DR1 (see FIG. 9).

Housing H

In the embodiment illustrated in FIG. 5, the housing H includes the side wall 47, which covers at least the middle portion 24 of the rotary shaft 2. In the embodiment illustrated in FIG. 5, the housing H includes the first end wall 45. In the embodiment illustrated in FIG. 6, a first hole 45h is formed in the first end wall 45. The rotary shaft 2 is located to pass through the first hole 45h. In the embodiment illustrated in FIG. 6, the inner surface of the first hole 45h functions as the above-mentioned second contact surface C2 (more specifically, the second inclined surface M2).

Second Embodiment

Figure 10:
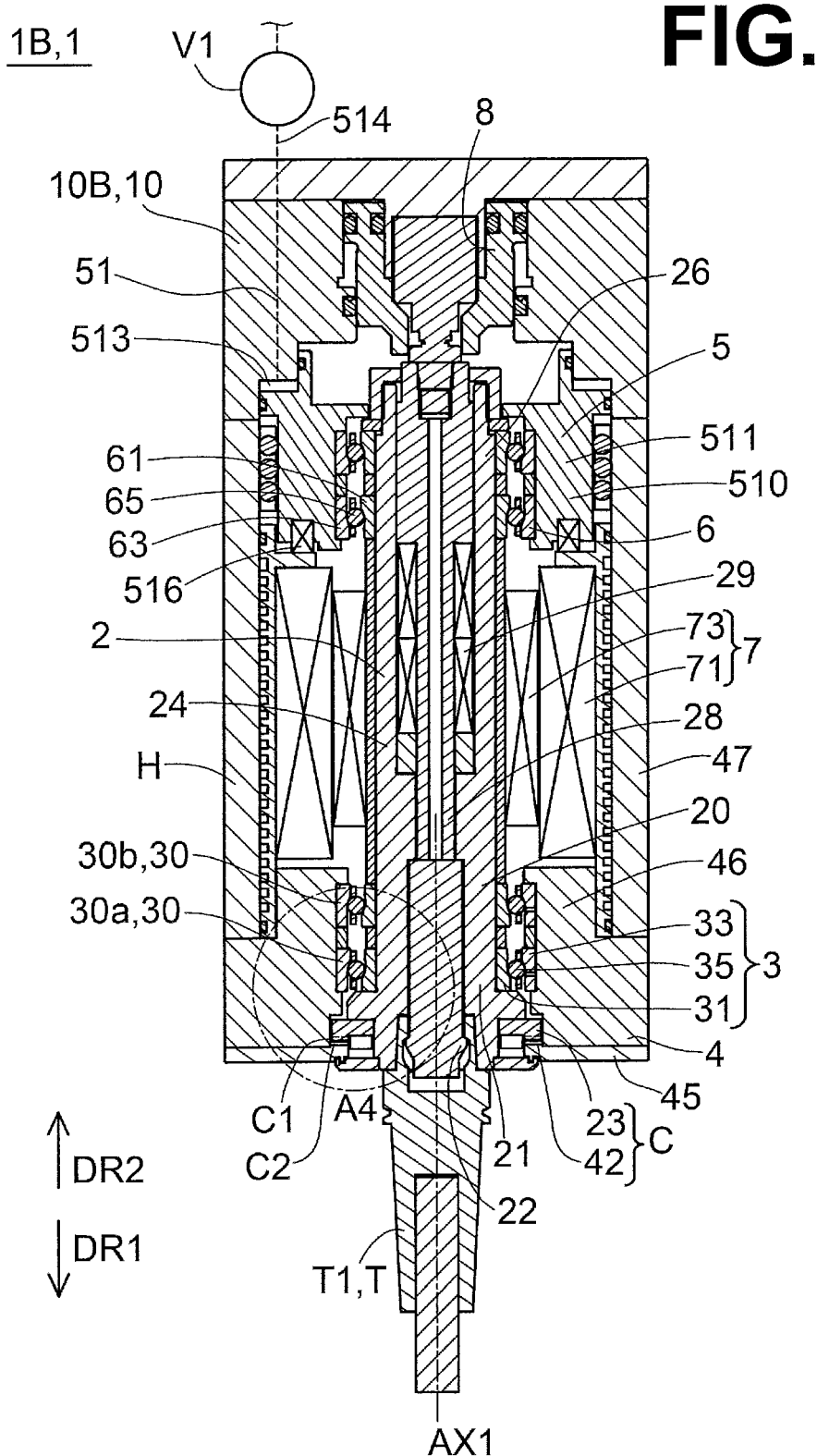
FIG. 10 is a schematic cross-sectional view of a machining head according to a second embodiment.
Figure 11:
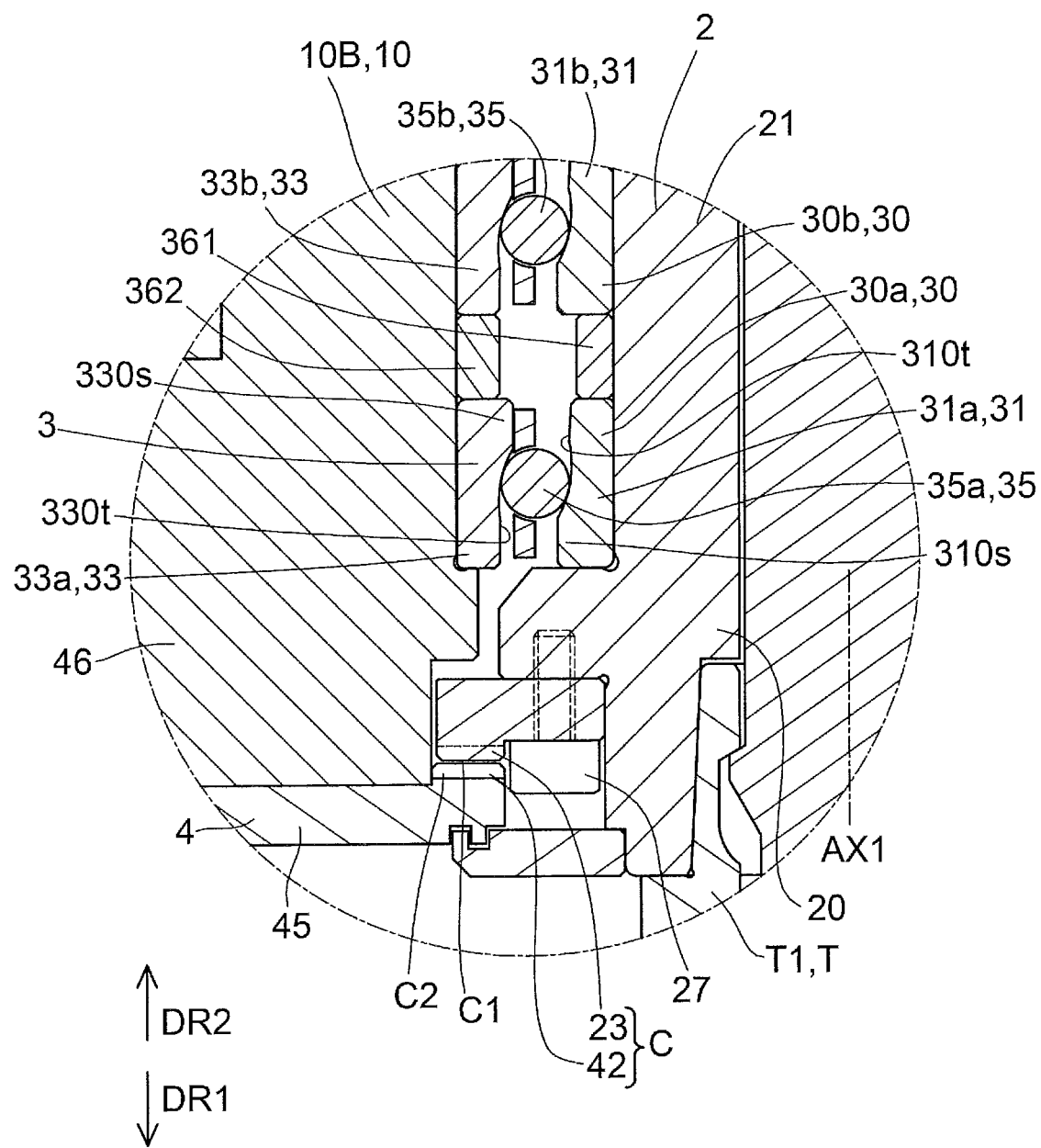
FIG. 11 is an enlarged view of the section indicated by circle A4 in FIG. 10.
Figure 12:
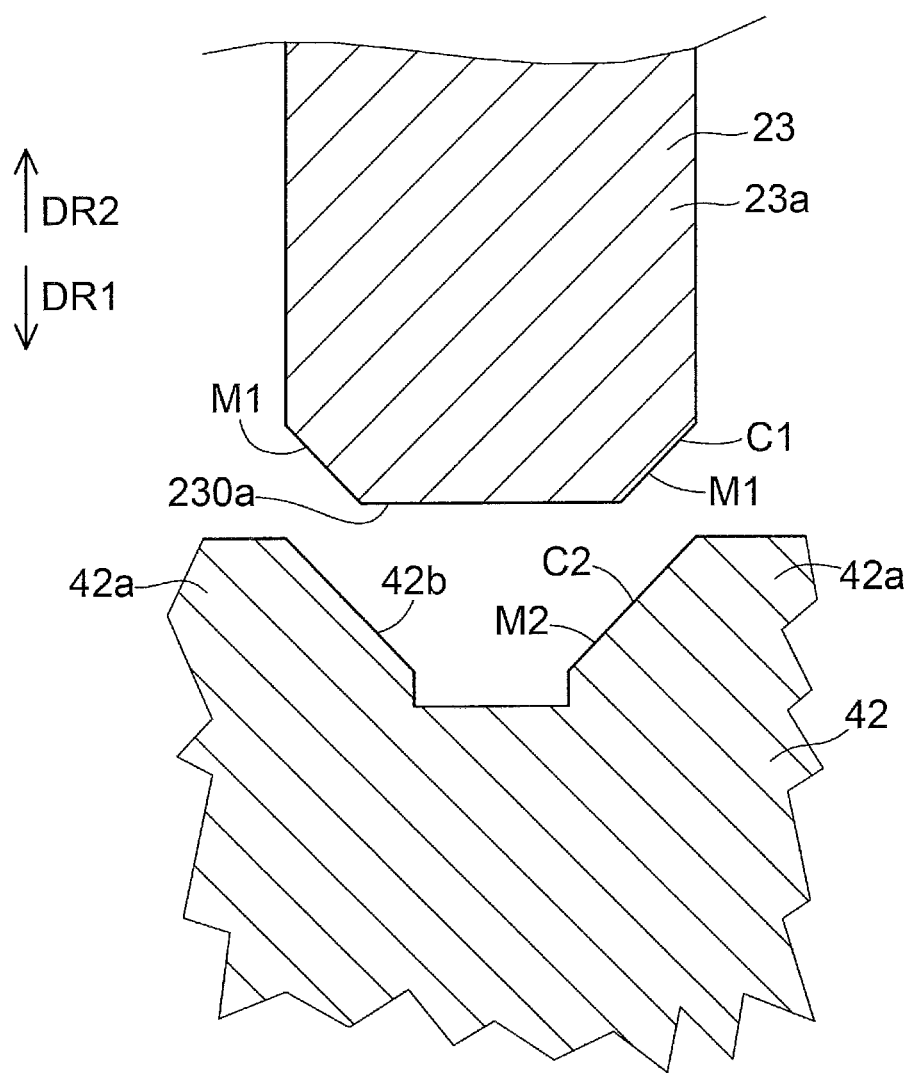
FIG. 12 is a schematic diagram illustrating the state in which a first coupling and a second coupling are disengaged from each other.
Figure 13:
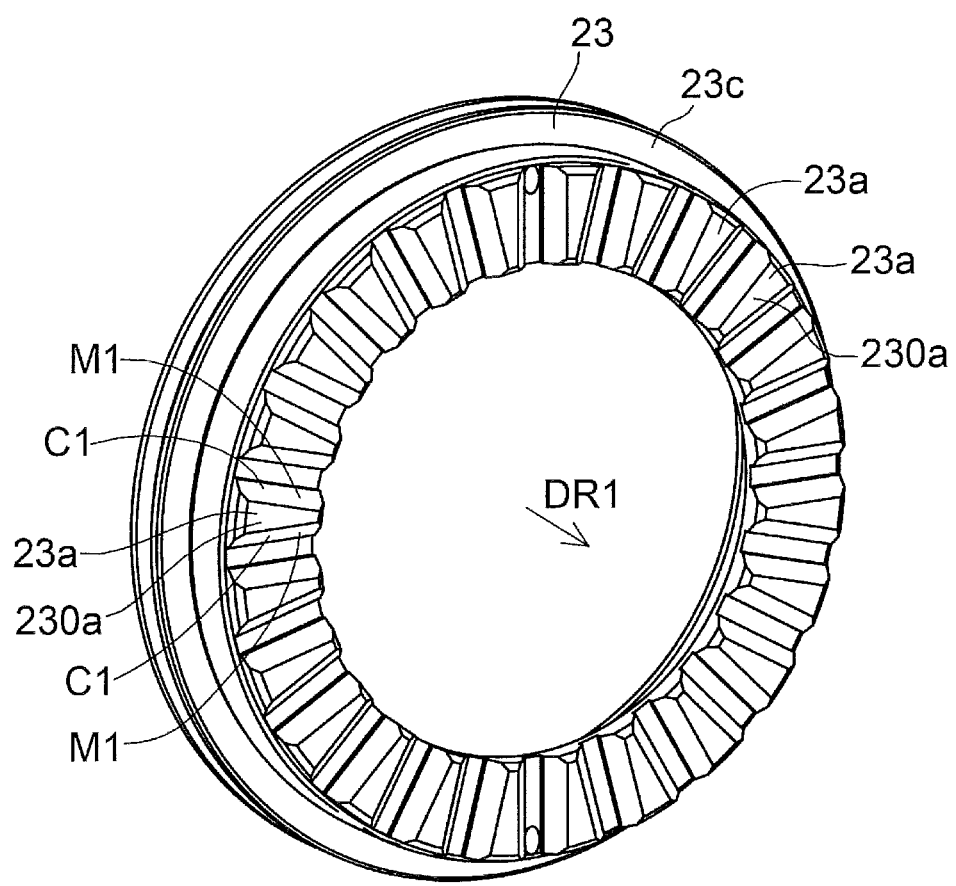
FIG. 13 is a schematic perspective view of the first coupling according to an embodiment.
Figure 14:
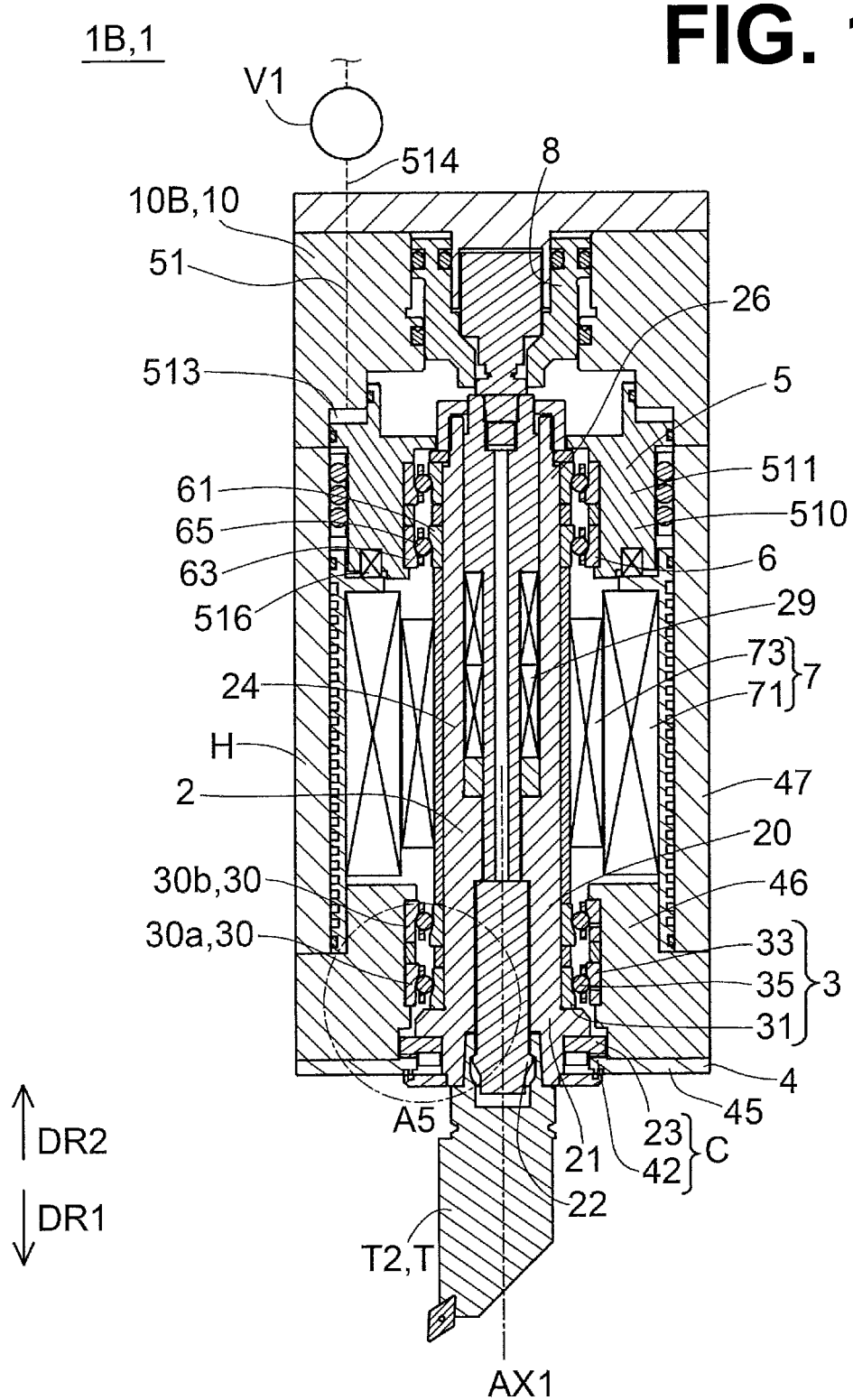
FIG. 14 is a schematic cross-sectional view of the machining head according to the second embodiment.
Figure 15:
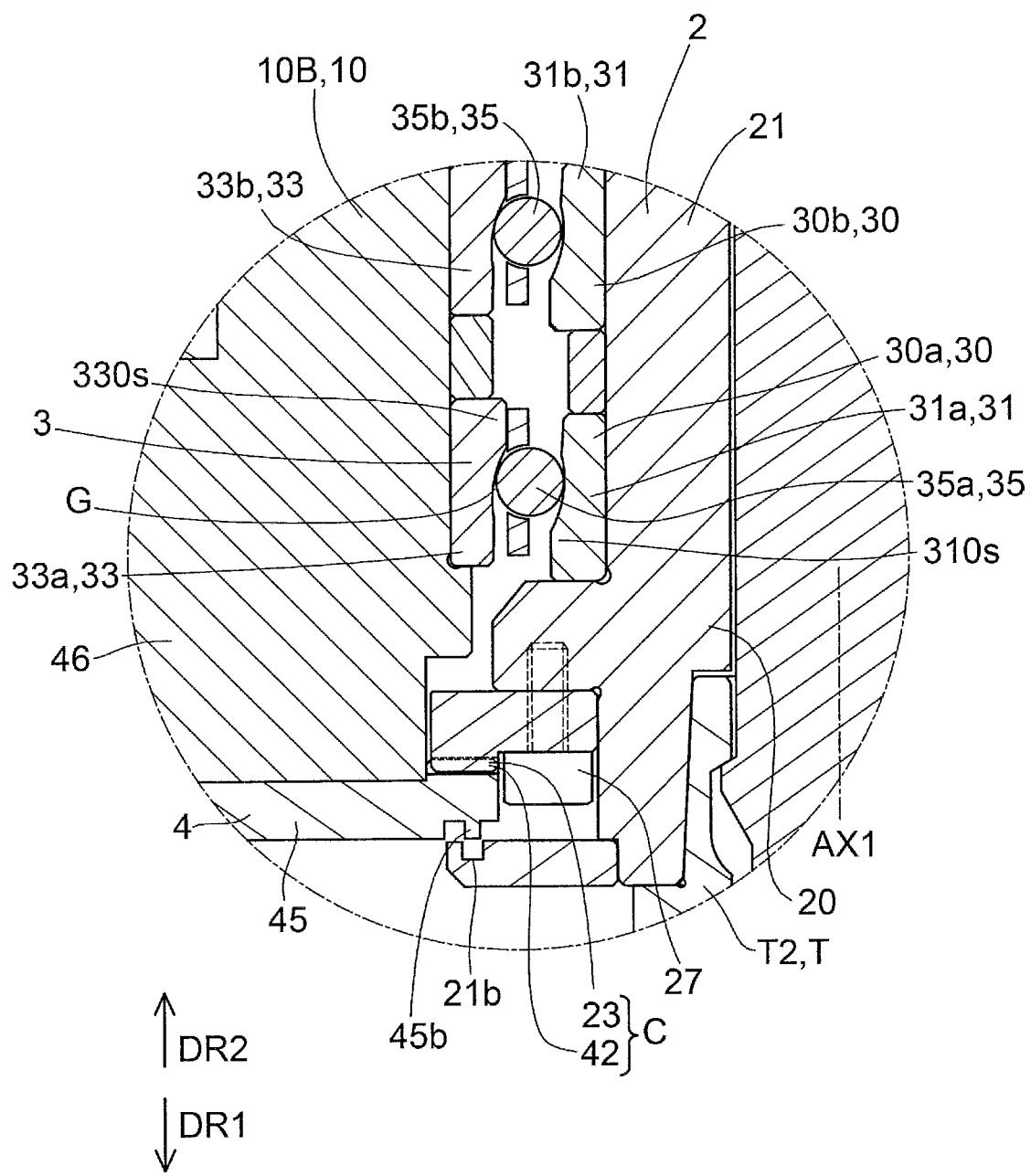
FIG. 15 is an enlarged view of the section indicated by circle A5 in FIG. 14.
Figure 16:
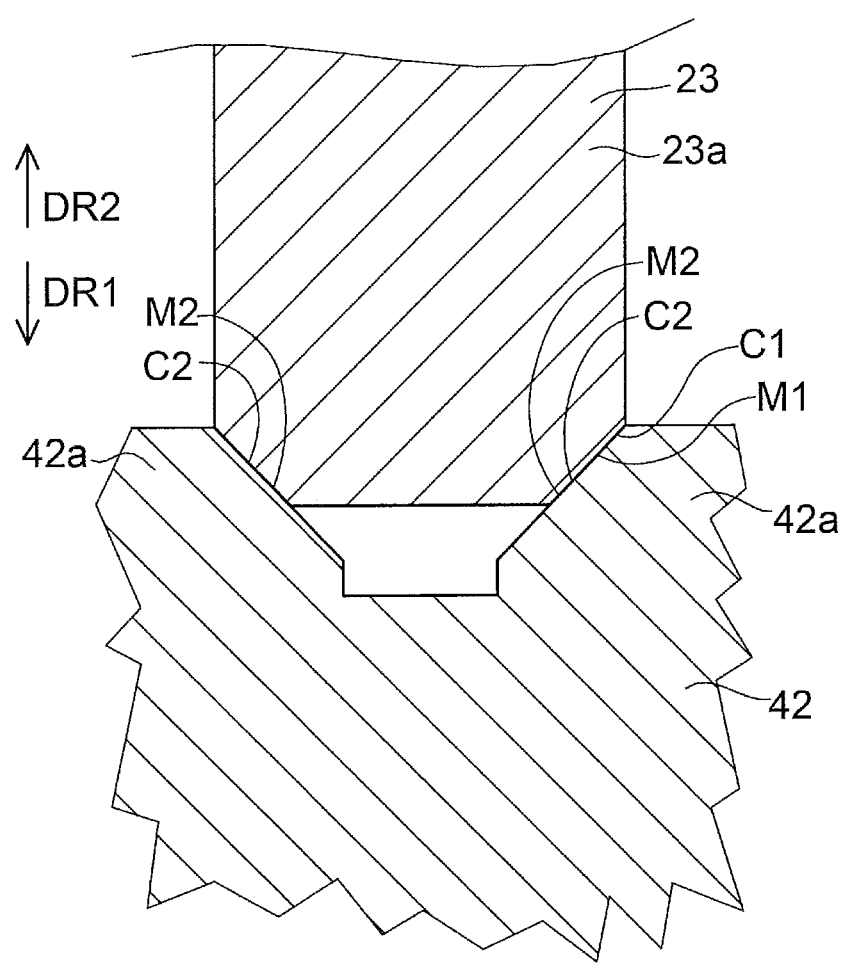
FIG. 16 is a schematic diagram illustrating the state in which the first coupling and the second coupling are engaged with each other.

A machining head 1B and a rotary shaft locking device 10B according to a second embodiment will be described with reference to FIGS. 10 to 16. FIG. 10 is a schematic cross-sectional view of the machining head 1B according to the second embodiment. FIG. 11 is an enlarged view of the section indicated by circle A4 drawn with an alternate long and short dash line in FIG. 10. FIG. 12 is a schematic diagram illustrating the state in which a first coupling 23 and a second coupling 42 are disengaged from each other. FIG. 13 is a schematic perspective view of the first coupling 23 according to an embodiment. FIG. 14 is a schematic cross-sectional view of the machining head 1B according to the second embodiment. FIG. 15 is an enlarged view of the section indicated by circle A5 drawn with an alternate long and short dash line in FIG. 14. FIG. 16 is a schematic diagram illustrating the state in which the first coupling 23 and the second coupling 42 are engaged with each other.

In the second embodiment, the differences from the first embodiment will mainly be described. Meanwhile, in the second embodiment, redundant descriptions of items that have already been described in the first embodiment are omitted. Therefore, in the second embodiment, even without an explicit description, it will be readily understood that the items that have already been described in the first embodiment may be applied to the second embodiment.

In the second embodiment, the structure of the locking mechanism C, which locks the rotation of the rotary shaft 2, differs from the structure of the locking mechanism C according to the first embodiment. The second embodiment is identical to the first embodiment in other aspects. In the second embodiment, the locking mechanism C will mainly be described, and redundant descriptions of structures other than the locking mechanism C are omitted.

As illustrated in FIG. 10, the rotary shaft locking device 10B according to the second embodiment includes (1) the rotary shaft 2, which includes the mounting portion 22 on which the tool T will be mounted and first contact surfaces C1 and is rotatable about the first axis AX1, (2) the first angular contact ball bearing 3, which includes the inner ring 31 supported by the rotary shaft 2, the outer ring 33, and the plurality of balls 35 located between the inner ring 31 and the outer ring 33, (3) the support member 4, which includes second contact surfaces C2 that come into contact with the first contact surfaces C1 to lock the rotation of the rotary shaft 2 and rotatably supports the rotary shaft 2 through the first angular contact ball bearing 3, and (4) the drive unit 5, which moves the rotary shaft 2 and the inner ring 31 relative to the support member 4 and the outer ring 33 in the first direction DR1 parallel to the first axis AX1 so that the first contact surfaces C1 come into contact with the second contact surfaces C2 and so that the precompression that acts on the plurality of balls 35 is reduced.

The machining head 1B according to the second embodiment includes the first rotary drive unit 7, which rotates the rotary shaft 2 about the first axis AX1, the housing H, which surrounds the rotary shaft 2, and the above-mentioned rotary shaft locking device 10B.

Thus, the second embodiment has the same advantages as the first embodiment.

Locking Mechanism C that Locks Rotation of Rotary Shaft 2

In the embodiment illustrated in FIG. 11, the rotary shaft locking device 10B includes the locking mechanism C that locks the rotation of the rotary shaft 2. The locking mechanism C includes the first coupling 23 and the second coupling 42. In the embodiment illustrated in FIG. 11, the rotary shaft 2 includes the first coupling 23, and the support member 4 includes the second coupling 42.

In the embodiment illustrated in FIG. 12, the first coupling 23 (that is, the coupling on the rotary shaft 2) includes the first contact surfaces C1. The first contact surfaces C1 include first inclined surfaces M1. In the embodiment illustrated in FIG. 12, the second coupling 42 (that is, the coupling on the support member 4) includes the second contact surfaces C2. The second contact surfaces C2 include second inclined surfaces M2.

In the embodiment illustrated in FIG. 11, the engagement between the first coupling 23 and the second coupling 42 locks the rotation of the rotary shaft 2. The state in which the first coupling 23 and the second coupling 42 are engaged with each other corresponds to the locked state, and the state in which the first coupling 23 and the second coupling 42 are disengaged from each other corresponds to the unlocked state. The drive unit 5 switches the state of the rotary shaft 2 between the locked state and the unlocked state.

More specifically, in the embodiment illustrated in FIG. 10, when the drive unit 5 moves the rotary shaft 2 in the first direction DR1, the inner ring 31 moves relative to the outer ring 33 so that the precompression that acts on the plurality of balls 35 is reduced. Additionally, when the drive unit 5 moves the rotary shaft 2 in the first direction DR1, the first coupling 23 and the second coupling 42 engage with each other (see FIG. 15). This locks the rotary shaft 2. In the embodiment illustrated in FIG. 16, in the state in which the rotation of the rotary shaft 2 is locked, the first contact surfaces C1 of the first coupling 23 (more specifically, the first inclined surfaces M1) are in contact with the second contact surfaces C2 of the second coupling 42 (more specifically, the second inclined surfaces M2).

In the embodiment illustrated in FIG. 15, in the state in which the rotation of the rotary shaft 2 is locked, the precompression that acts on the plurality of balls 35 is reduced (typically, a space is formed that permits each of the plurality of balls 35 to move relative to the outer ring 33 and the inner ring 31 in any direction, and the load that acts on the plurality of balls 35 from the inner ring 31 is not transmitted to the outer ring 33). Thus, when a workpiece is turned using the lathe tool T2 mounted on the rotary shaft 2 with the rotation of the rotary shaft 2 locked, fretting is unlikely to occur on the contact surfaces between the balls 35 and the rings (31 and 33).

In the embodiment illustrated in FIG. 14, when the drive unit 5 moves the rotary shaft 2 in the second direction DR2, the inner ring 31 moves relative to the outer ring 33 so that the precompression that acts on the plurality of balls 35 is increased. Additionally, when the drive unit 5 moves the rotary shaft 2 in the second direction DR2, the first coupling 23 and the second coupling 42 are disengaged from each other (see FIG. 11). In this manner, the rotary shaft 2 is unlocked from the support member 4. In the embodiment illustrated in FIG. 12, in the state in which the rotary shaft 2 is unlocked, the first contact surfaces C1 of the first coupling 23 are separate from the second contact surfaces C2 of the second coupling 42.

In the embodiment illustrated in FIG. 11, in the state in which the rotary shaft 2 is rotatable about the first axis AX1, the precompression that acts on the plurality of balls 35 is increased. Thus, in the case in which a workpiece is machined using the milling tool T1 mounted on the rotary shaft 2, the axial load that acts on the milling tool T1 and the rotary shaft 2 is supported by the first angular contact ball bearing 3 in a suitable manner.

In the embodiment illustrated in FIG. 11, the rotary shaft 2 includes the rotary shaft body 20 and the first coupling 23, and the first coupling 23 is secured to the rotary shaft body 20 using a fastener 27. In the embodiment illustrated in FIG. 11, the first coupling 23 is located forward of the first angular contact ball bearing 3.

In the embodiment illustrated in FIG. 11, the second coupling 42 is located forward of the first coupling 23. In the embodiment illustrated in FIG. 11, the second coupling 42 is a fixed coupling that is fixed to the first block 46 of the support member 4. The second coupling 42 is located on the first end wall 45 of the support member 4. Alternatively, the second coupling 42 may be located on a different section of the support member 4.

In the embodiment illustrated in FIG. 12, the first coupling 23 includes a first tooth 23a, which projects toward the second coupling 42. In the embodiment illustrated in FIG. 12, the first tooth 23a has a distal end face 230a. The distal end face 230a will be received by a recessed portion 42b of the second coupling 42. In the embodiment illustrated in FIG. 13, the first coupling 23 includes first teeth 23a each of which includes first contact surfaces C1 (more specifically, first inclined surfaces M1). In the embodiment illustrated in FIG. 13, the first inclined surfaces M1 are located on both sides of the distal end face 230a of each of the first teeth 23a of the first coupling 23.

As illustrated in FIG. 13, the first coupling 23 may include the plurality of first teeth 23a and a first annular body 23c on which the plurality of first teeth 23a are located. In the embodiment illustrated in FIG. 13, the first teeth 23a project from the first annular body 23c in the first direction DR1.

In the embodiment illustrated in FIG. 12, the second coupling 42 includes second teeth 42a, which project toward the first coupling 23. In the embodiment illustrated in FIG. 12, the second coupling 42 includes the recessed portion 42b formed between two adjacent second teeth 42a. In the embodiment illustrated in FIG. 12, each of the second teeth 42a of the second coupling 42 has the second contact surface C2 (more specifically, the second inclined surface M2).

The second coupling 42 may include the plurality of second teeth 42a and a second annular body on which the plurality of second teeth 42a are located.

In the second embodiment, the engagement between the first coupling 23 and the second coupling 42 locks the rotation of the rotary shaft 2. In this case, the stiffness of the rotary shaft 2 in the state in which the rotation of the rotary shaft 2 is locked is improved. Additionally, when the first coupling 23 and the second coupling 42 are engaged, the positioning accuracy of the rotary shaft 2 in the rotation direction about the first axis AX1 is improved. Thus, the turning is performed with higher accuracy.

Third Embodiment

Figure 17:
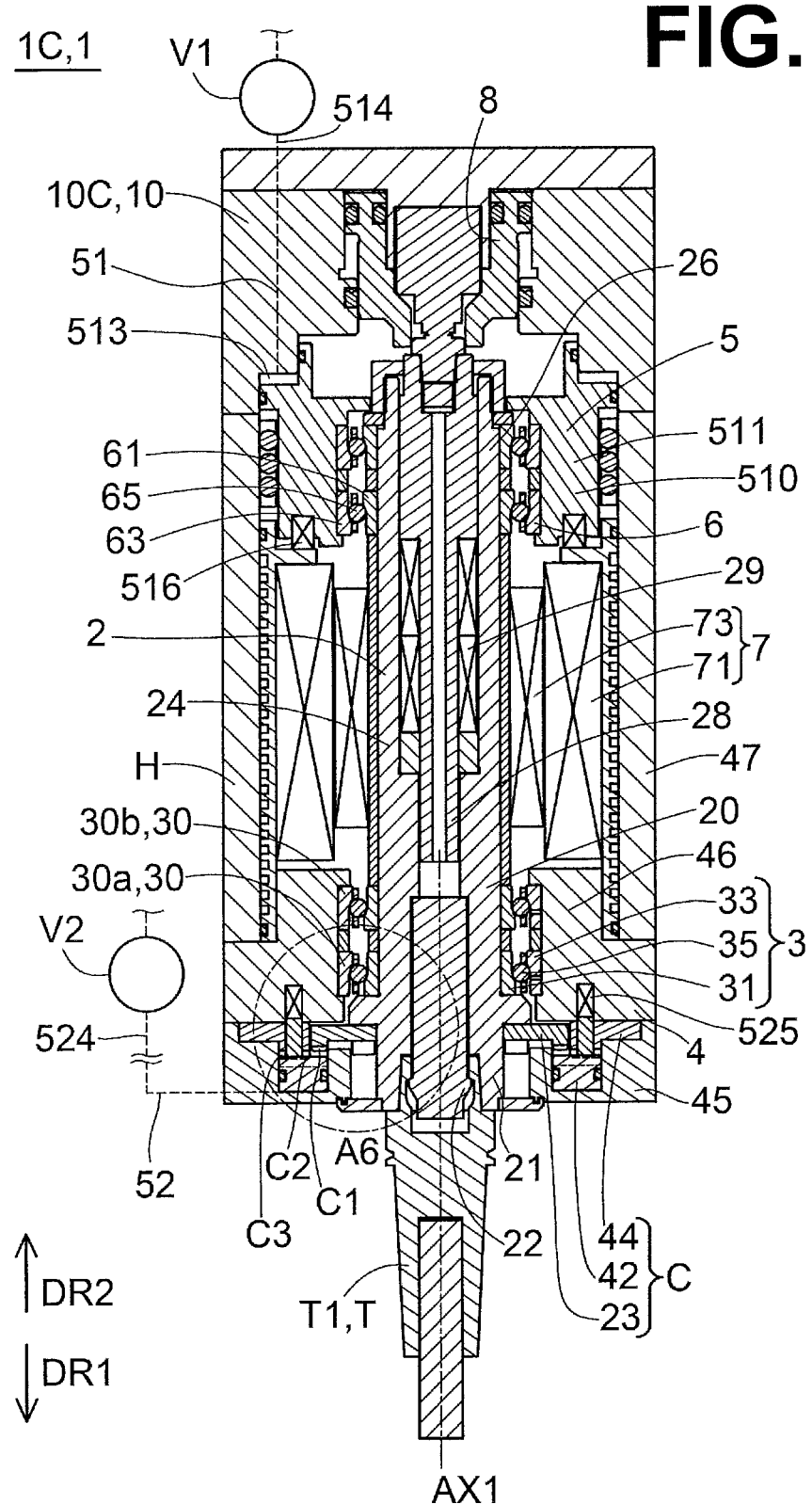
FIG. 17 is a schematic cross-sectional view of a machining head according to a third embodiment.
Figure 18:
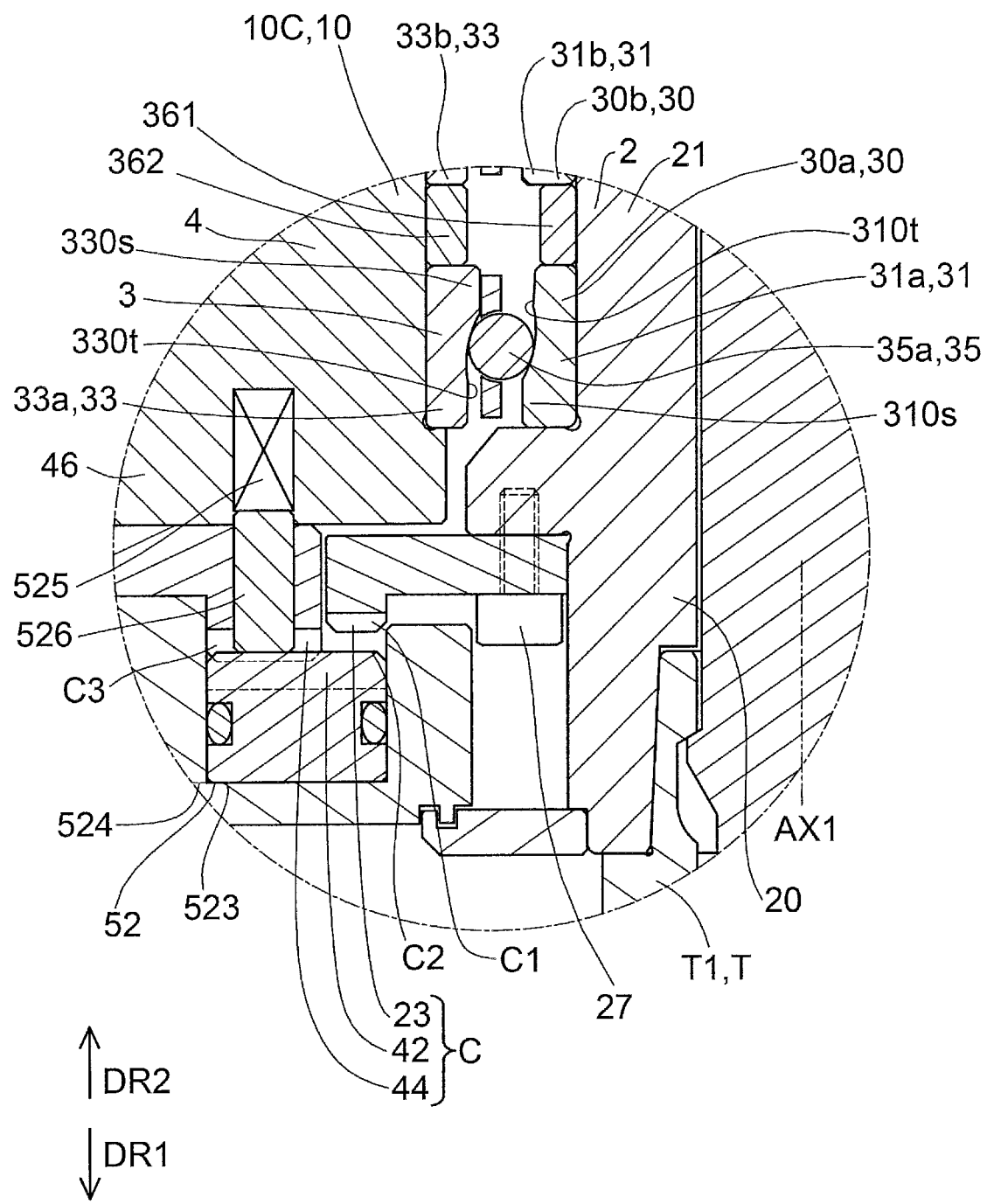
FIG. 18 is an enlarged view of the section indicated by circle A6 in FIG. 17.
Figure 19:
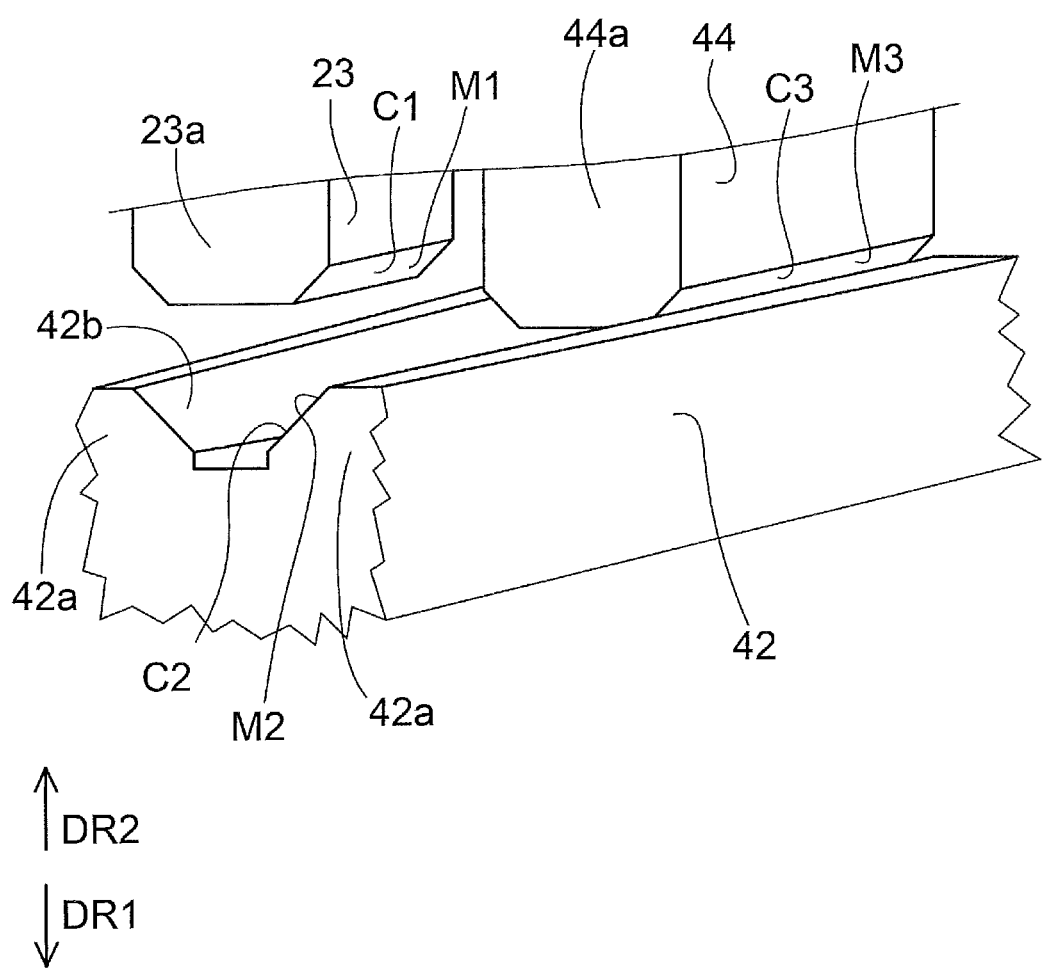
FIG. 19 is a schematic diagram illustrating the state in which the first coupling and the second coupling are disengaged from each other.
Figure 20:
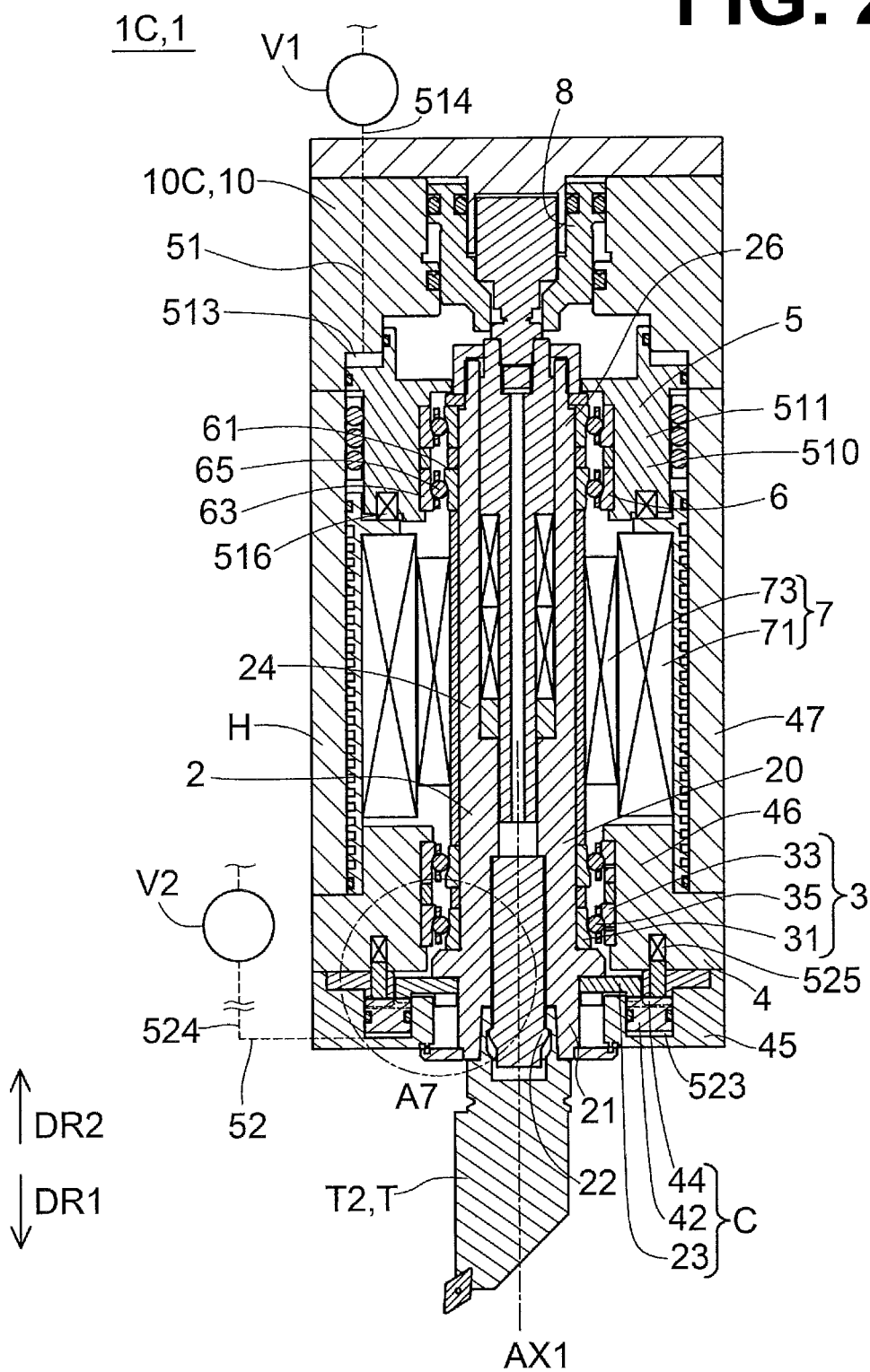
FIG. 20 is a schematic cross-sectional view of a machining head according to the third embodiment.
Figure 21:
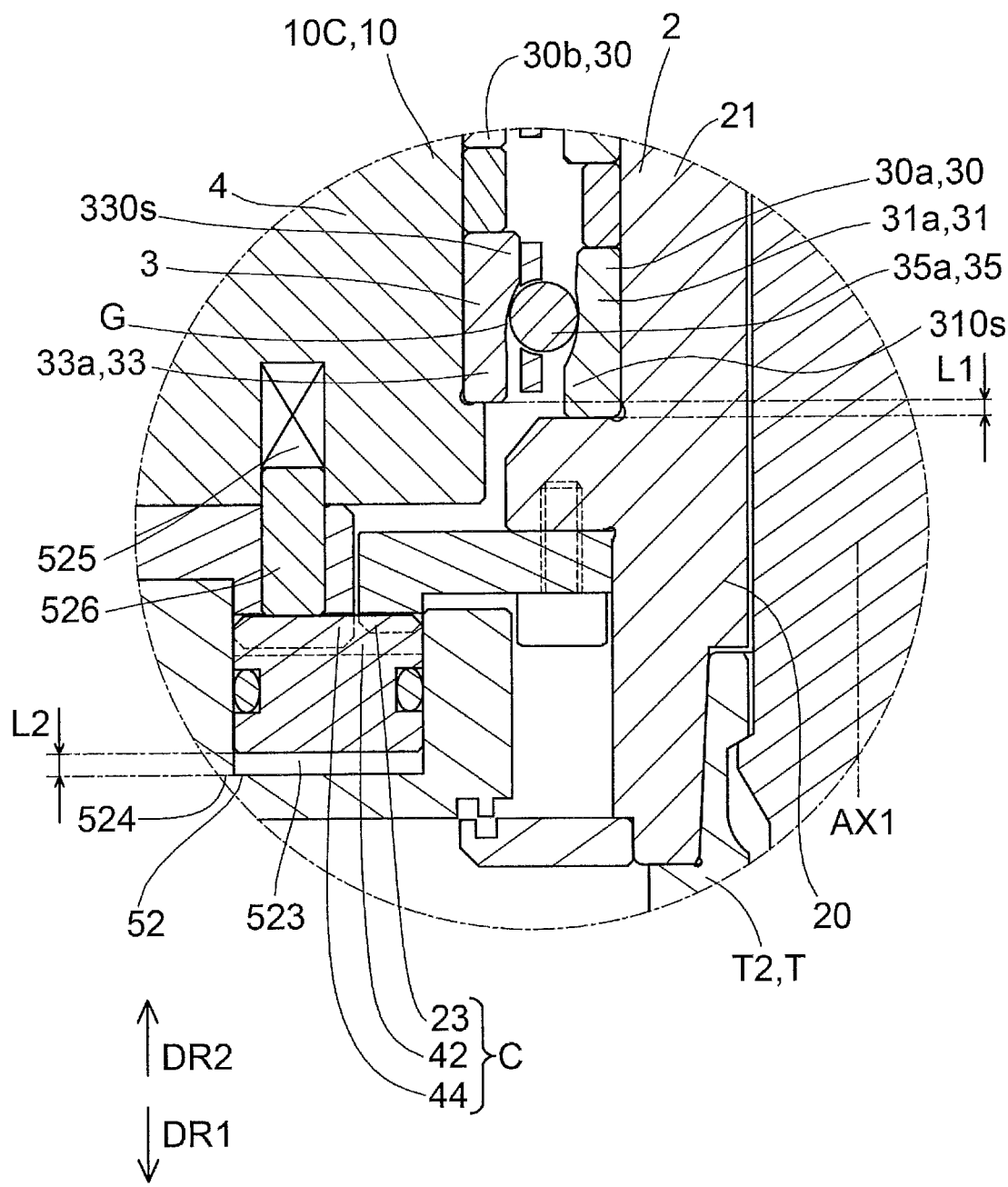
FIG. 21 is an enlarged view of the section indicated by circle A7 in FIG. 20.
Figure 22:
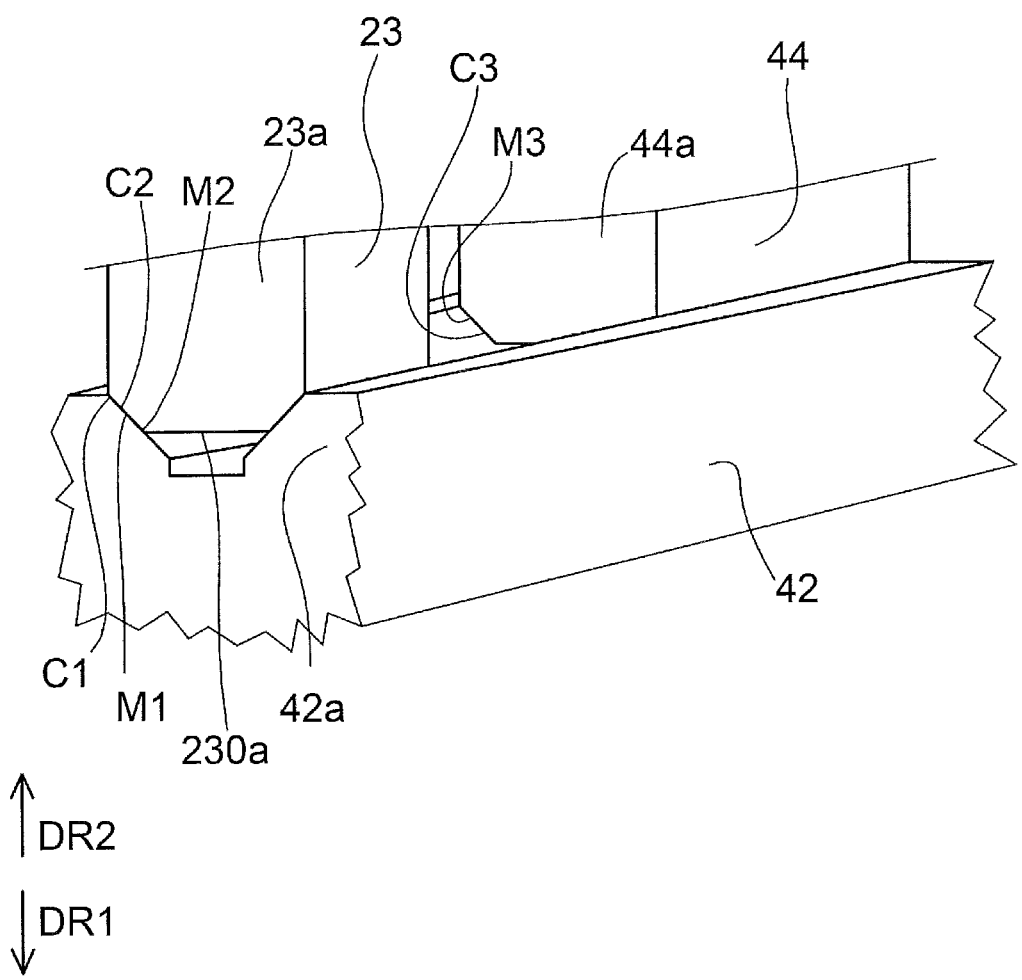
FIG. 22 is a schematic diagram illustrating the state in which the first coupling and a third coupling are engaged with the second coupling.

A machining head 1C and a rotary shaft locking device 10C according to a third embodiment will be described with reference to FIGS. 17 to 22. FIG. 17 is a schematic cross-sectional view of the machining head 1C according to the third embodiment. FIG. 18 is an enlarged view of the section indicated by circle A6 drawn with an alternate long and short dash line in FIG. 17. FIG. 19 is a schematic diagram illustrating the state in which the first coupling 23 and the second coupling 42 are disengaged from each other. FIG. 20 is a schematic cross-sectional view of the machining head 1C according to the third embodiment. FIG. 21 is an enlarged view of the section indicated by circle A7 drawn with an alternate long and short dash line in FIG. 20. FIG. 22 is a schematic diagram illustrating the state in which the first coupling 23 and a third coupling 44 are engaged with the second coupling 42.

In the third embodiment, the differences from the first embodiment and the second embodiment will mainly be described. Meanwhile, in the third embodiment, redundant descriptions of items that have already been described in the first embodiment or the second embodiment are omitted. Therefore, in the third embodiment, even without an explicit description, it will be readily understood that the items that have already been described in the first embodiment or the second embodiment may be applied to the third embodiment.

In the third embodiment, the structure of the locking mechanism C, which locks the rotation of the rotary shaft 2, and the structure associated with the locking mechanism C differ from the structure of the locking mechanism C and the structure associated with the locking mechanism C according to the first embodiment and the second embodiment. The third embodiment is identical to the first embodiment or the second embodiment in other aspects. For this reason, in the third embodiment, the locking mechanism C and the structure associated with the locking mechanism C will mainly be described, and redundant descriptions of structures other than the above are omitted.

As illustrated in FIG. 17, the rotary shaft locking device 10C according to the third embodiment includes (1) the rotary shaft 2, which includes the mounting portion 22 on which the tool T will be mounted and the first contact surfaces C1 and is rotatable about the first axis AX1, (2) the first angular contact ball bearing 3, which includes the inner ring 31 supported by the rotary shaft 2, the outer ring 33, and the plurality of balls 35 located between the inner ring 31 and the outer ring 33, (3) the support member 4, which includes the second contact surfaces C2 that come into contact with the first contact surfaces C1 to lock the rotation of the rotary shaft 2 and rotatably supports the rotary shaft 2 through the first angular contact ball bearing 3, and (4) the drive unit 5, which moves the rotary shaft 2 and the inner ring 31 relative to the support member 4 and the outer ring 33 in the first direction DR1 parallel to the first axis AX1 so that the first contact surfaces C1 come into contact with the second contact surfaces C2 and so that the precompression that acts on the plurality of balls 35 is reduced.

The machining head 1C according to the third embodiment includes the first rotary drive unit 7, which rotates the rotary shaft 2 about the first axis AX1, the housing H, which surrounds the rotary shaft 2, and the above-mentioned rotary shaft locking device 10C.

Thus, the third embodiment has the same advantages as the first embodiment.

Locking Mechanism C that Locks Rotation of Rotary Shaft 2

In the embodiment illustrated in FIG. 17, the rotary shaft locking device 10C includes the locking mechanism C that locks the rotation of the rotary shaft 2. The locking mechanism C includes the first coupling 23, the second coupling 42, and the third coupling 44. In the embodiment illustrated in FIG. 18, the rotary shaft 2 includes the first coupling 23, and the support member 4 includes the second coupling 42 and the third coupling 44. The second coupling 42 is movable relative to the third coupling 44. In the embodiment illustrated in FIG. 18, the second coupling 42 is a piston driven by hydraulic pressure.

In the embodiment illustrated in FIG. 19, the first coupling 23 (that is, the coupling on the rotary shaft 2) includes the first contact surfaces C1. The first contact surfaces C1 include the first inclined surfaces M1. In the embodiment illustrated in FIG. 19, the second coupling 42 (that is, the coupling on the support member 4) includes the second contact surfaces C2, and the third coupling 44 (that is, the other coupling on the support member 4) includes third contact surfaces C3. The second contact surfaces C2 include the second inclined surfaces M2, and the third contact surfaces C3 include third inclined surfaces M3.

The engagement of the second coupling 42 with both the first coupling 23 and the third coupling 44 locks the rotation of the rotary shaft 2. The state in which the second coupling 42 is engaged with both the first coupling 23 and the third coupling 44 (see FIG. 21) corresponds to the locked state, and the state in which the second coupling 42 is disengaged from the first coupling 23 (see FIG. 18) corresponds to the unlocked state. In the unlocked state (see FIG. 18), the second coupling 42 and the third coupling 44 may be completely disengaged, or the second coupling 42 and the third coupling 44 do not necessarily have to be completely disengaged.

The drive unit 5 switches the state of the rotary shaft 2 between the locked state and the unlocked state. In the embodiment illustrated in FIG. 17, the drive unit 5 includes the first drive unit 51, which moves the first movable member 510, which presses the rotary shaft 2, and a second drive unit (an example of "second actuator") 52, which moves the second coupling 42. In the embodiment illustrated in FIG. 17, each of the first drive unit 51 and the second drive unit 52 functions as part of the drive unit 5, which switches the state of the rotary shaft 2 from the unlocked state to the locked state.

The second drive unit 52 moves the second coupling 42 so that the second coupling 42 engages with both the first coupling 23 and the third coupling 44.

In the embodiment illustrated in FIG. 17, the second drive unit 52 applies a drive force to the second coupling 42, which functions as a second movable member. In the embodiment illustrated in FIG. 18, the second drive unit 52 includes a second oil chamber 523 and a second pipe 524, which supplies oil to the second oil chamber 523. The second drive unit 52 may include a second valve V2 (see FIG. 17), which controls the flow direction of the oil in the second pipe 524.

In the embodiment illustrated in FIG. 18, the second drive unit 52 includes a second urging member 525 (for example, a spring), which urges the second coupling 42 in the direction away from the first coupling 23. The second drive unit 52 includes a pressing member 526, which presses the second coupling 42 in the direction away from the first coupling 23 (more specifically, in the first direction DR1) by the urging force of the second urging member 525.

In the embodiment illustrated in FIG. 18, when oil is supplied from the second pipe 524 to the second oil chamber 523, the second coupling 42 moves toward the first coupling 23. In the embodiment illustrated in FIG. 21, when the oil is discharged from the second oil chamber 523 through the second pipe 524, the second coupling 42 moves in the direction away from the first coupling 23 by the urging force of the second urging member 525.

In the embodiment illustrated in FIG. 17, when the second drive unit 52 moves the second coupling 42 toward the first coupling 23 (in the second direction DR2 in the embodiment illustrated in FIG. 17), the second coupling 42 engages with the first coupling 23 and the third coupling 42.

In the embodiment illustrated in FIG. 17, when the first drive unit 51 moves the first movable member 510 in the first direction DR1, the rotary shaft 2 and the inner ring 31, which is supported by the rotary shaft 2, move in the first direction DR1. As a result, the precompression that acts on the plurality of balls 35 is reduced (typically, the plurality of balls 35 are each allowed to move relative to the outer ring 33 and the inner ring 31 in any direction). Additionally, the first contact surfaces C1 of the first coupling 23, which is located on the rotary shaft 2, abut against the second contact surfaces C2 of the second coupling 42. This reinforces the engagement between the first coupling 23 and the second coupling 42.

As illustrated in FIG. 22, in the state in which the rotation of the rotary shaft 2 is locked, the first inclined surfaces M1 of the first coupling 23 are in contact with the second inclined surfaces M2 of the second coupling 42. Additionally, in the state in which the rotation of the rotary shaft 2 is locked, the second inclined surfaces M2 of the second coupling 42 are in contact with the third inclined surfaces M3 of the third coupling 44.

In the embodiment illustrated in FIG. 20, when the second drive unit 52 (more specifically, the second urging member 525) moves the second coupling 42 in the direction away from the first coupling 23 (in the first direction DR1 in the embodiment illustrated in FIG. 20), the second coupling 42 is disengaged from the first coupling 23.

In the embodiment illustrated in FIG. 20, when the first drive unit 51 (more specifically, the first urging member 516) moves the first movable member 510 in the second direction DR2, the rotary shaft 2 and the inner ring 31, which is supported by the rotary shaft 2, move in the second direction DR2. As a result, the precompression that acts on the plurality of balls 35 is increased.

As illustrated in FIG. 19, in the state in which the second coupling 42 and the first coupling 23 are disengaged, the first inclined surfaces M1 of the first coupling 23 are separate from the second inclined surfaces M2 of the second coupling 42.

In the embodiment illustrated in FIG. 21, a motion stroke L1 of the inner ring 31 (that is, the motion stroke L1 of the inner ring 31 when the unlocked state is switched to the locked state) is smaller than a motion stroke L2 of the second coupling 42 (that is, the motion stroke L2 of the second coupling 42 when the unlocked state is switched to the locked state).

When the motion stroke L1 is smaller than the motion stroke L2, the first coupling 23 and the second coupling 42 are switched from the disengaged state to the engaged state mainly by the second drive unit 52. In this case, the couplings (23, 42) including high-stiffness teeth with a high tooth height can be employed without being restricted by the structure of the first angular contact ball bearing 3 (for example, the amount that the inner ring 31 can move relative to the outer ring 33 in the first direction D1, in other words, the amount of backlash of the first angular contact ball bearing 3).

In a fourth embodiment described below, the motion stroke L1 of the inner ring 31 (that is, the motion stroke L1 of the inner ring 31 when the unlocked state is switched to the locked state) is also preferably smaller than the motion stroke L2 of the second coupling 42 (that is, the motion stroke L2 of the second coupling 42 when the unlocked state is switched to the locked state) (see FIG. 26).

Fourth Embodiment

Figure 23:
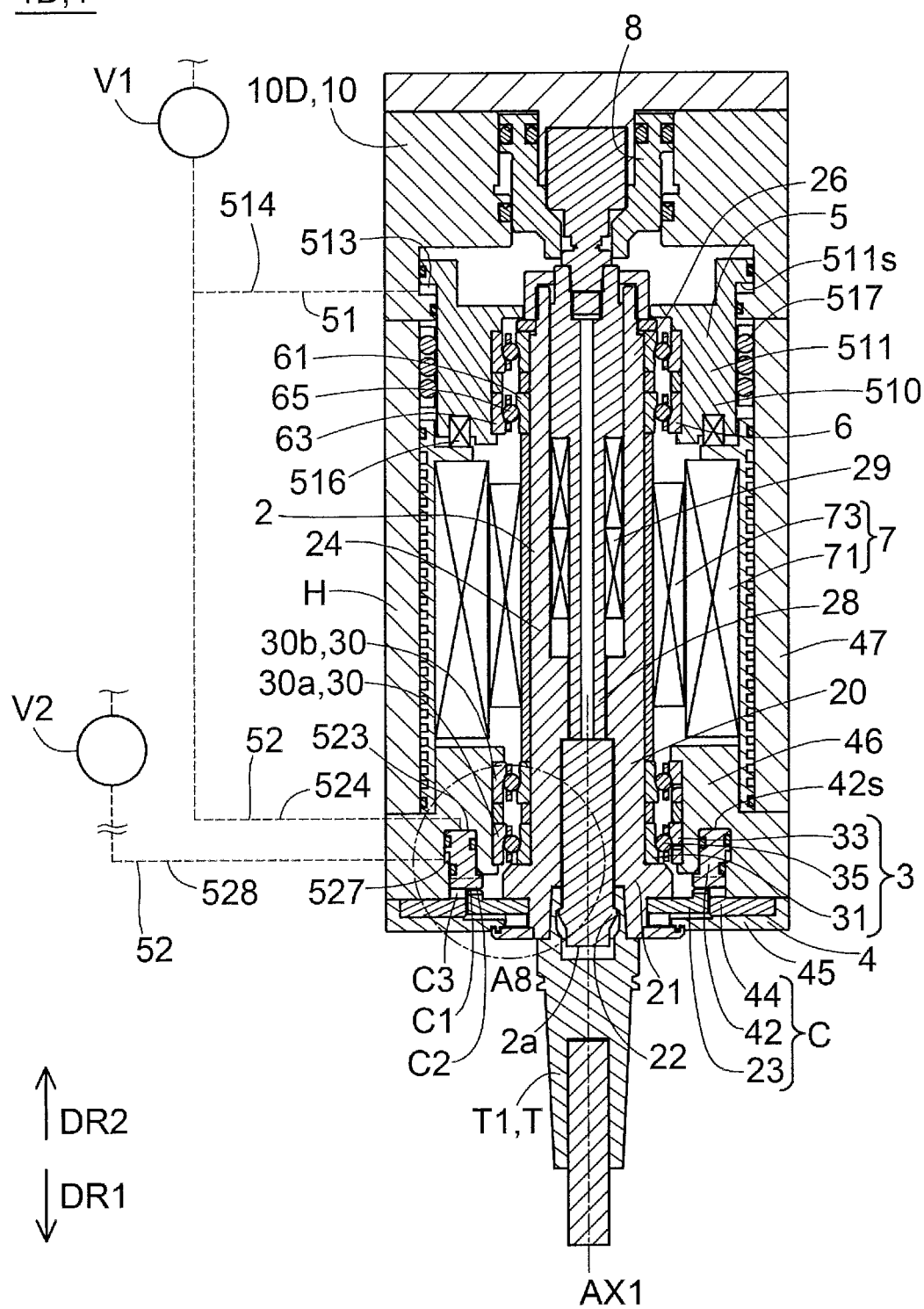
FIG. 23 is a schematic cross-sectional view of a machining head according to a fourth embodiment.
Figure 24:
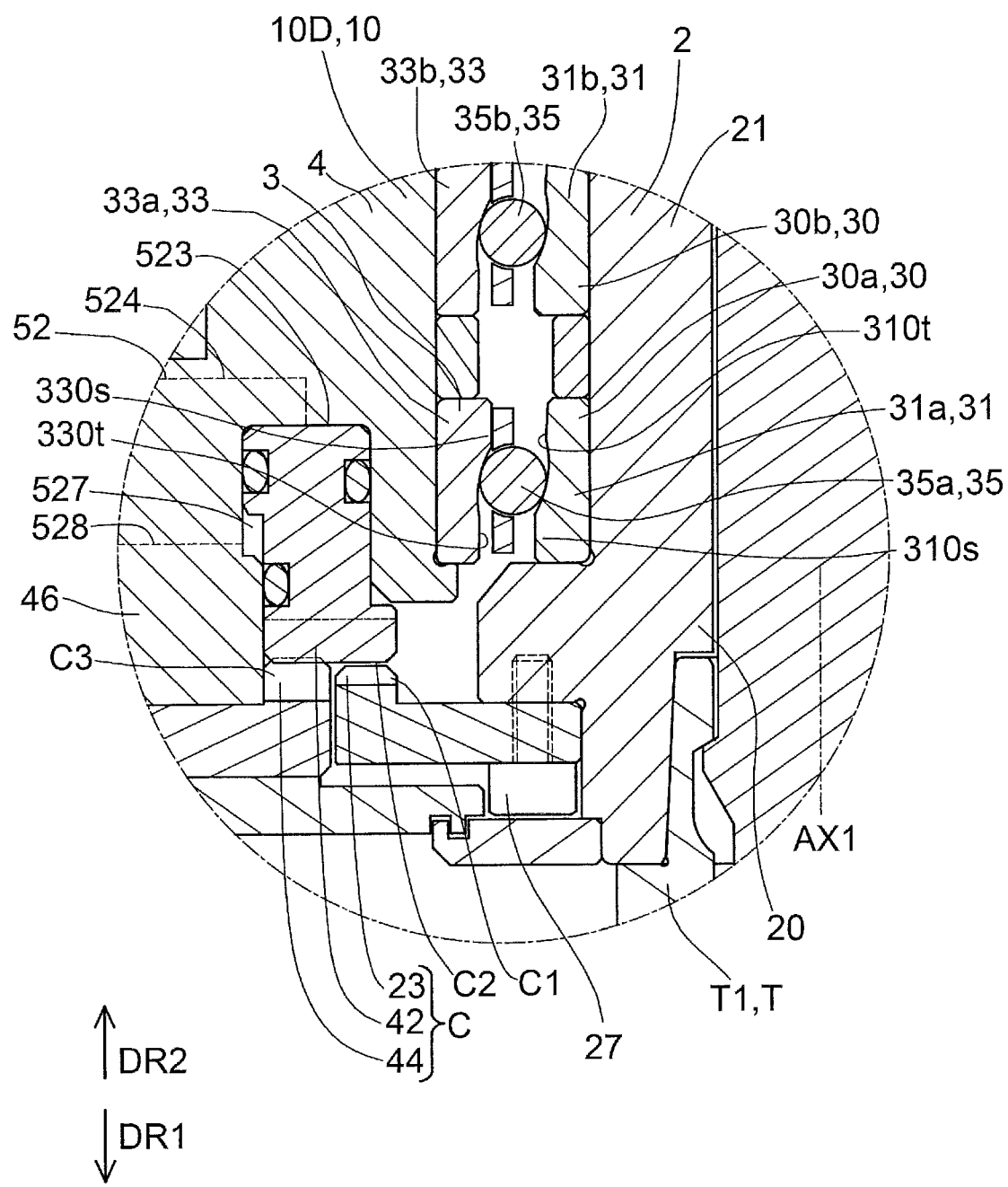
FIG. 24 is an enlarged view of the section indicated by circle A8 in FIG. 23.
Figure 25:
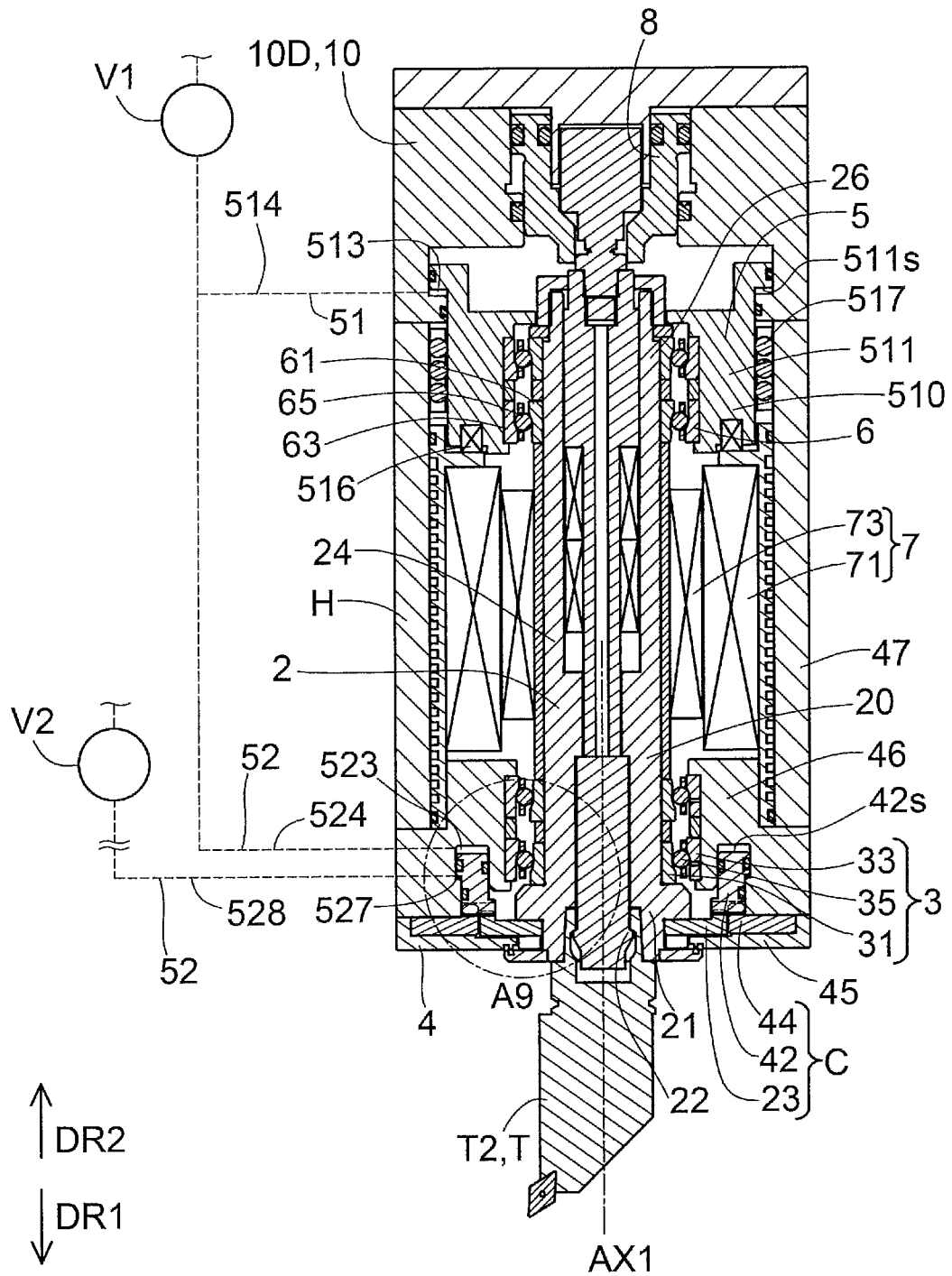
FIG. 25 is a schematic cross-sectional view of a machining head according to the fourth embodiment.
Figure 27:
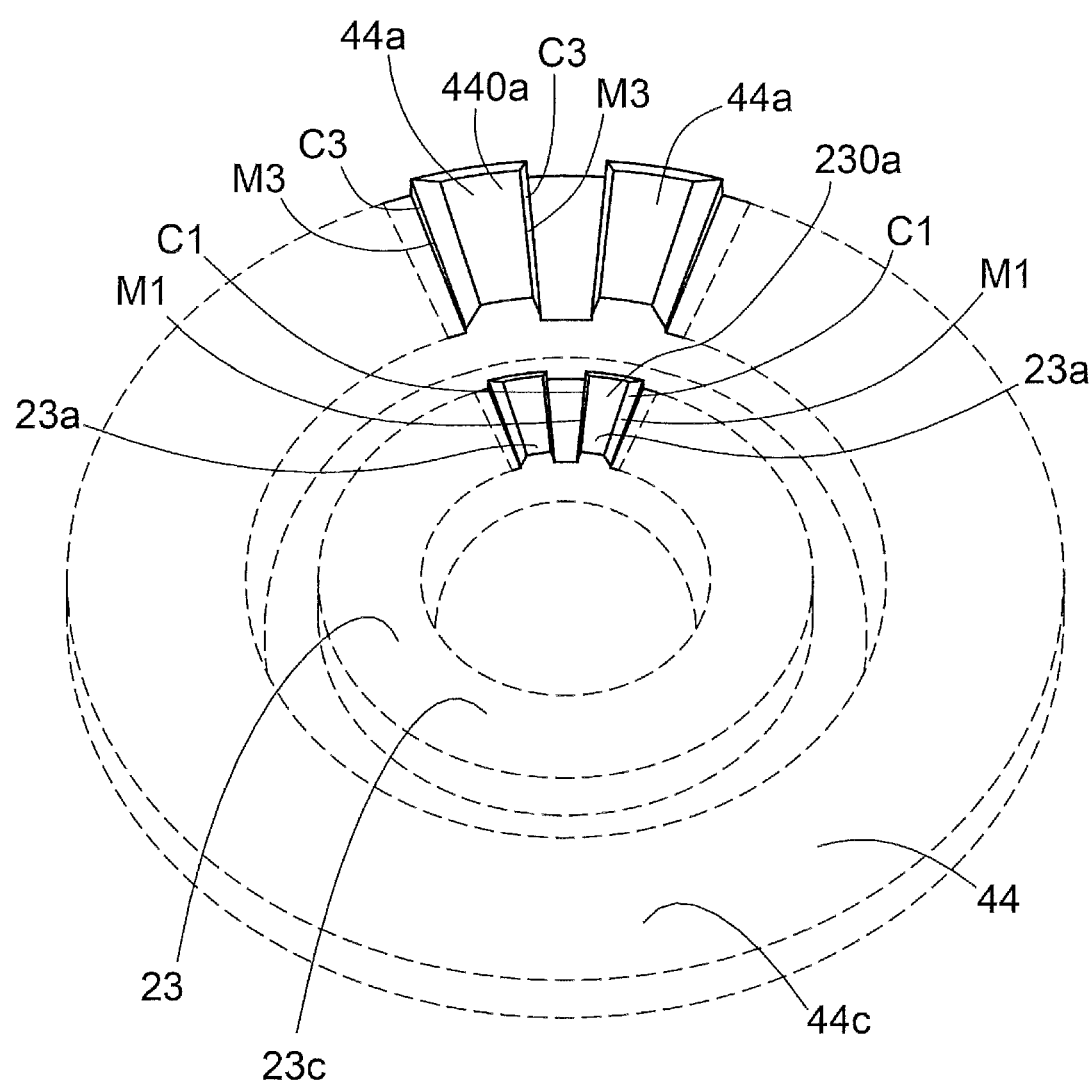
FIG. 27 is a schematic diagram illustrating the first coupling and the third coupling according to an embodiment.
Figure 28:
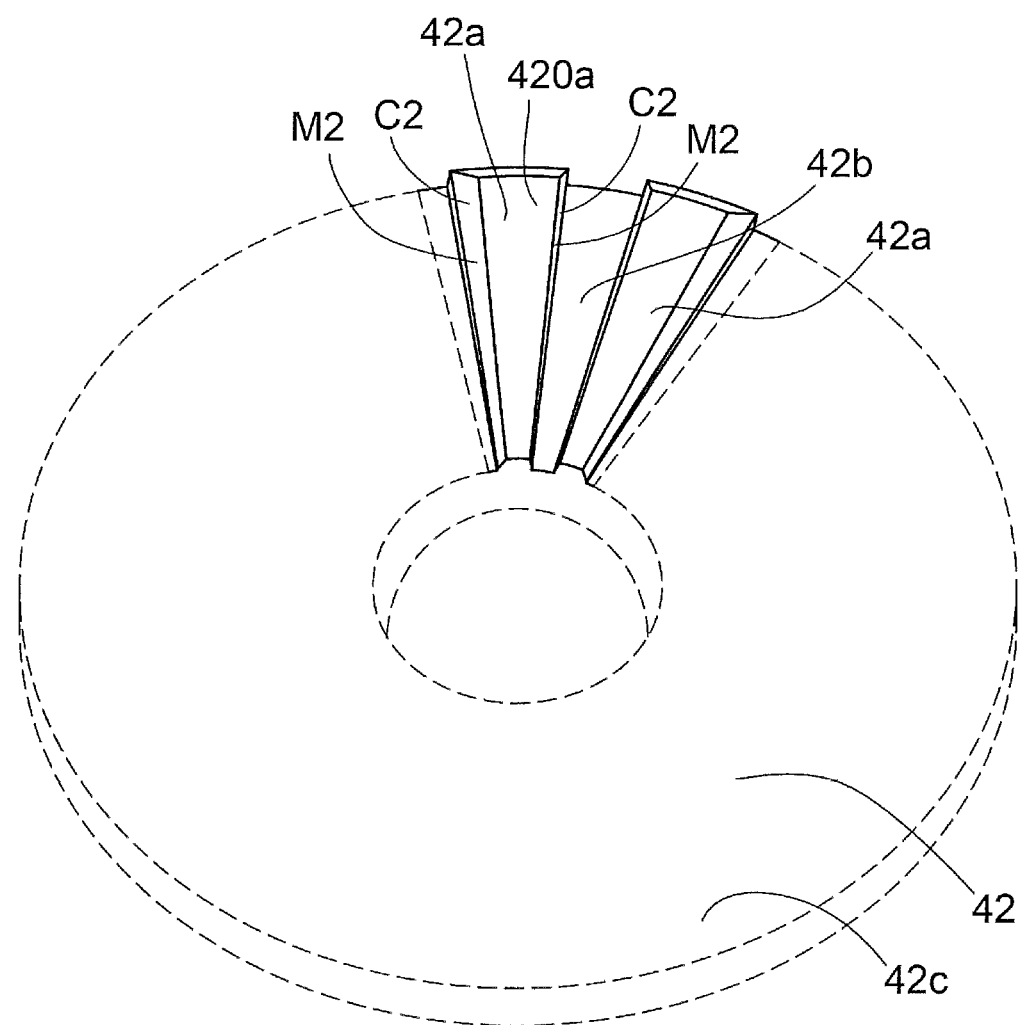
FIG. 28 is a schematic view of the second coupling according to an embodiment.

A machining head 1D and a rotary shaft locking device 10D according to a fourth embodiment will be described with reference to FIGS. 23 to 28. FIG. 23 is a schematic cross-sectional view of the machining head 1D according to the fourth embodiment. FIG. 24 is an enlarged view of the section indicated by circle A8 drawn with an alternate long and short dash line in FIG. 23. FIG. 25 is a schematic cross-sectional view of the machining head 1D according to the fourth embodiment. FIG. 26 is an enlarged view of the section indicated by circle A9 drawn with an alternate long and short dash line in FIG. 25. FIG. 27 is a schematic diagram illustrating the first coupling 23 and the third coupling 44 according to an embodiment. In FIG. 27, the broken lines indicate the outlines of the first coupling 23 and the third coupling 44. In FIG. 27, the illustration of the teeth (23a, 44a) in the region surrounded by the broken line is omitted. FIG. 28 is a schematic diagram illustrating the second coupling 42 according to an embodiment. In FIG. 28, the broken line indicates the outline of the second coupling 42. In FIG. 28, the illustration of the teeth (42a) in the region surrounded by the broken line is omitted.

In the fourth embodiment, the differences from the first embodiment, the second embodiment, and the third embodiment will mainly be described. Meanwhile, in the fourth embodiment, redundant descriptions of items that have already been described in the first embodiment, the second embodiment, or the third embodiment are omitted. Therefore, in the fourth embodiment, even without an explicit description, it will be readily understood that the items that have already been described in the first embodiment, the second embodiment, or the third embodiment may be applied to the fourth embodiment.

In the third embodiment, the switching of the unlocked state to the locked state includes moving the second coupling 42 rearward (more specifically, in the second direction DR2). Instead, in the fourth embodiment, the switching of the unlocked state to the locked state includes moving the second coupling 42 forward (more specifically, in the first direction DR1). In the fourth embodiment, differences from the first embodiment to the third embodiment will mainly be described regarding the locking mechanism C, the first drive unit 51, the second drive unit 52, the first coupling 23, the second coupling 42, and the third coupling 44, and redundant descriptions of other structures are omitted.

As illustrated in FIG. 23, the rotary shaft locking device 10D according to the fourth embodiment includes (1) the rotary shaft 2, which includes the mounting portion 22 on which the tool T will be mounted and the first contact surfaces C1 and is rotatable about the first axis AX1, (2) the first angular contact ball bearing 3, which includes the inner ring 31 supported by the rotary shaft 2, the outer ring 33, and the plurality of balls 35 located between the inner ring 31 and the outer ring 33, (3) the support member 4, which includes the second contact surfaces C2 that come into contact with the first contact surfaces C1 to lock the rotation of the rotary shaft 2 and rotatably supports the rotary shaft 2 through the first angular contact ball bearing 3, and (4) the drive unit 5, which moves the rotary shaft 2 and the inner ring 31 relative to the support member 4 and the outer ring 33 in the first direction DR1 parallel to the first axis AX1 so that the first contact surfaces C1 come into contact with the second contact surfaces C2 and so that the precompression that acts on the plurality of balls 35 is reduced.

The machining head 1D according to the fourth embodiment includes the first rotary drive unit 7, which rotates the rotary shaft 2 about the first axis AX1, the housing H, which surrounds the rotary shaft 2, and the above-mentioned rotary shaft locking device 10D.

Thus, the fourth embodiment has the same advantages as the first embodiment.

Locking Mechanism C that Locks Rotation of Rotary Shaft 2

In the embodiment illustrated in FIG. 23, the rotary shaft locking device 10D includes the locking mechanism C that locks the rotation of the rotary shaft 2. The locking mechanism C includes the first coupling 23, the second coupling 42, and the third coupling 44. In the embodiment illustrated in FIG. 24, the rotary shaft 2 includes the first coupling 23, and the support member 4 includes the second coupling 42 and the third coupling 44. The second coupling 42 is movable relative to the third coupling 44.

The state in which the second coupling 42 is engaged with both the first coupling 23 and the third coupling 44 (see FIG. 26) corresponds to the locked state, and the state in which the second coupling 42 is disengaged from the first coupling 23 (see FIG. 24) corresponds to the unlocked state. In the unlocked state (see FIG. 24), the second coupling 42 and the third coupling 44 may be completely disengaged, or the second coupling 42 and the third coupling 44 do not necessarily have to be completely disengaged.

In the embodiment illustrated in FIG. 24, the second coupling 42 driven by the second drive unit 52 is located rearward of (more specifically, further in the second direction DR2 than) the first coupling 23 and the third coupling 44. This allows the drive system that drives the second coupling 42 to be located rearward of the third coupling 44. As a result, the distance between the distal end of the rotary shaft 2 and the first angular contact ball bearing 3 is reduced, and the radial stiffness of the rotary shaft 2 is improved. In this case, the milling tool T1 mounted on the rotary shaft 2 is rotated about the first axis AX1 in a stable manner.

Drive Unit 5

The drive unit 5 switches the state of the rotary shaft 2 between the locked state and the unlocked state. In the embodiment illustrated in FIG. 23, the drive unit 5 includes the first drive unit 51, which moves the first movable member 510, which presses the rotary shaft 2, and the second drive unit 52, which moves the second coupling 42. In the embodiment illustrated in FIG. 23, each of the first drive unit 51 and the second drive unit 52 functions as part of the drive unit 5, which switches the state of the rotary shaft 2 from the unlocked state to the locked state in which the rotary shaft 2 is locked.

First Drive Unit 51

In the embodiment illustrated in FIG. 23, the first drive unit 51 includes the first oil chamber 513 and the first pipe 514, which supplies oil to the first oil chamber 513. The first drive unit 51 may include the first valve V1, which controls the flow direction of the oil in the first pipe 514.

In the embodiment illustrated in FIG. 23, the first drive unit 51 drives the first movable member 510. The first movable member 510 presses the rotary shaft 2 through the second angular contact ball bearing 6, which is located on the rear end portion 26 of the rotary shaft 2.

Alternatively, the first movable member 510 may directly press the rotary shaft 2. In this case, the first movable member 510 may be located forward of the stator 71. In the embodiment illustrated in FIG. 23, the first movable member 510 is located rearward of the stator 71.

In the embodiment illustrated in FIG. 23, the first movable member 510 includes the first piston 511. In the embodiment illustrated in FIG. 23, the first drive unit 51 includes the plurality of rolling elements 517, which are located around the first piston 511 and guide the movement of the first piston 511.

In the embodiment illustrated in FIG. 23, the first drive unit 51 includes the first urging member 516 (for example, a spring), which applies an urging force to the first movable member 510. The first urging member 516 urges the first movable member 510 in the second direction DR2. In the embodiment illustrated in FIG. 23, the first urging member 516 is located between the first movable member 510 and the support member 4.

The first urging member 516 applies an urging force to the first movable member 510, the rotary shaft 2, and the inner ring 31 in the second direction DR2 (in other words, the direction opposite to the first direction DR1). In the embodiment illustrated in FIG. 23, in the unlocked state in which the rotation of the rotary shaft 2 is permitted, the plurality of balls 35 receive, from the inner ring 31, the precompression that corresponds to the amount of the urging force applied by the first urging member 516.

Second Drive Unit 52

The second drive unit 52 moves the second coupling 42 so that the second coupling 42 engages with both the first coupling 23 and the third coupling 44.

In the embodiment illustrated in FIG. 23, the second drive unit 52 applies a drive force to the second coupling 42, which functions as the second movable member. In the embodiment illustrated in FIG. 23, the second drive unit 52 includes the second oil chamber 523 and the second pipe 524, which supplies oil to the second oil chamber 523. The second drive unit 52 may include a valve, which controls the flow direction of the oil in the second pipe 524. In the embodiment illustrated in FIG. 23, the valve that controls the flow direction of the oil in the second pipe 524 is the same as the first valve V1, which controls the flow direction of the oil in the first pipe 514. Alternatively, the valve that controls the flow direction of the oil in the second pipe 524 may be a valve different from the first valve V1, which controls the flow direction of the oil in the first pipe 514.

In the embodiment illustrated in FIG. 23, the first oil chamber 513 and the second oil chamber 523 are connected to each other through the first pipe 514 and the second pipe 524. In this case, the hydraulic pressure in the second oil chamber 523 is substantially equal to the hydraulic pressure in the first oil chamber 513.

As illustrated in FIG. 23, the second drive unit 52 may include a third oil chamber 527 and a third pipe 528, which supplies oil to the third oil chamber 527. The second drive unit 52 may include the second valve V2, which controls the flow direction of the oil in the third pipe 528.

In the embodiment illustrated in FIG. 23, the second valve V2, which controls the flow direction of the oil in the third pipe 528, is a valve different from the first valve V1, which controls the flow direction of the oil in the second pipe 524.

Alternatively, the flow direction of the oil in the third pipe 528 and the flow direction of the oil in the second pipe 524 may be controlled by one switching valve.

In the embodiment illustrated in FIG. 23, when the oil is supplied from the second pipe 524 to the second oil chamber 523, the second coupling 42 moves toward the first coupling 23. When the oil is supplied from the third pipe 528 to the third oil chamber 527, the second coupling 42 moves away from the first coupling 23.

Switching from Unlocked State to Locked State

In the embodiment illustrated in FIG. 23, in switching the state of the rotary shaft 2 from the unlocked state to the locked state, the second drive unit 52 moves the second coupling 42 in the direction toward the first coupling 23 (in the first direction DR1 in the embodiment illustrated in FIG. 23).

When the second drive unit 52 moves the second coupling 42 toward the first coupling 23, the second coupling 42 engages with both the first coupling 23 and the third coupling 44. This locks the rotation of the rotary shaft 2.

The second drive unit 52 moves the second coupling 42, the rotary shaft 2, and the inner ring 31 integrally in the first direction DR1 with the second coupling 42 and the first coupling 23 engaged with each other. More specifically, when the second drive unit 52 moves the second coupling 42 in the first direction DR1, the second coupling 42 presses the rotary shaft 2 in the first direction DR1 through the first coupling 23. As a result, the rotary shaft 2 and the inner ring 31, which is supported by the rotary shaft 2, move relative to the outer ring 33 in the first direction DR1. When the inner ring 31 moves relative to the outer ring 33 in the first direction DR1, the precompression that acts on the plurality of balls 35 is reduced (typically, a space is formed that permits each of the plurality of balls 35 to move relative to the outer ring 33 and the inner ring 31 in any direction, and the load that acts on the plurality of balls 35 from the inner ring 31 is not transmitted to the outer ring 33).

In the embodiment illustrated in FIG. 23, in switching the state of the rotary shaft 2 from the unlocked state to the locked state, the second drive unit 52 applies a first pressing force to the rotary shaft 2 in the first direction DR1, and the first drive unit 51 applies a second pressing force to the rotary shaft 2 in the second direction DR2.

More specifically, in the embodiment illustrated in FIG. 23, the second drive unit 52 increases the hydraulic pressure in the second oil chamber 523. When the hydraulic pressure in the second oil chamber 523 is increased, the second coupling 42 moves in the first direction DR1, and the second coupling 42 presses the first coupling 23 and the rotary shaft 2 in the first direction DR1 (first pressing force). Additionally, in the embodiment illustrated in FIG. 23, the first drive unit 51 increases the hydraulic pressure in the first oil chamber 513. When the hydraulic pressure in the first oil chamber 513 is increased, the first movable member 510 presses the rotary shaft 2 in the second direction DR2 (second pressing force).

When the rotary shaft 2 receives the first pressing force from the second coupling 42 and the second pressing force from the first movable member 510, the first contact surfaces C1 of the first coupling 23, which is located on the rotary shaft 2, strongly abut against the second contact surfaces C2 of the second coupling 42, which is located on the support member 4. This reinforces the locking of the rotation of the rotary shaft 2. Since the second contact surfaces C2 of the second coupling 42 reliably abut against both the first contact surfaces C1 of the first coupling 23 and the third contact surfaces C3 of the third coupling 44, the positioning accuracy of the rotary shaft 2 in the rotation direction about the first axis AX1 is improved regardless of the machining accuracy or the assembly accuracy of the couplings (23, 42, and 44).

When the state of the rotary shaft 2 is switched from the unlocked state to the locked state, the first pressing force that the second drive unit 52 applies to the rotary shaft 2 in the first direction DR1 is greater than the second pressing force that the first drive unit 51 applies to the rotary shaft 2 in the second direction DR2. Since the first pressing force in the first direction DR1 is greater than the second pressing force in the second direction DR2, the rotary shaft 2 and the inner ring 31 move relative to the support member 4 and the outer ring 33 in the first direction DR1.

In the embodiment illustrated in FIG. 23, in order to make the first pressing force to be greater than the second pressing force, the area of a pressure receiving surface 42s of the second coupling 42 facing the second oil chamber 523 is greater than the area of the pressure receiving surface 511s of the first movable member 510 facing the first oil chamber 513. Alternatively or additionally, in order to make the first pressing force to be greater than the second pressing force, the hydraulic pressure in the second oil chamber 523 may be made greater than the hydraulic pressure in the first oil chamber 513.

Switching from Locked State to Unlocked State

In the embodiment illustrated in FIG. 25, in switching the state of the rotary shaft 2 from the locked state to the unlocked state, the second drive unit 52 moves the second coupling 42 in the direction away from the first coupling 23 (in the second direction DR2 in the embodiment illustrated in FIG. 25). As a result, the second coupling 42 and the first coupling 23 are disengaged from each other.

Figure 26:
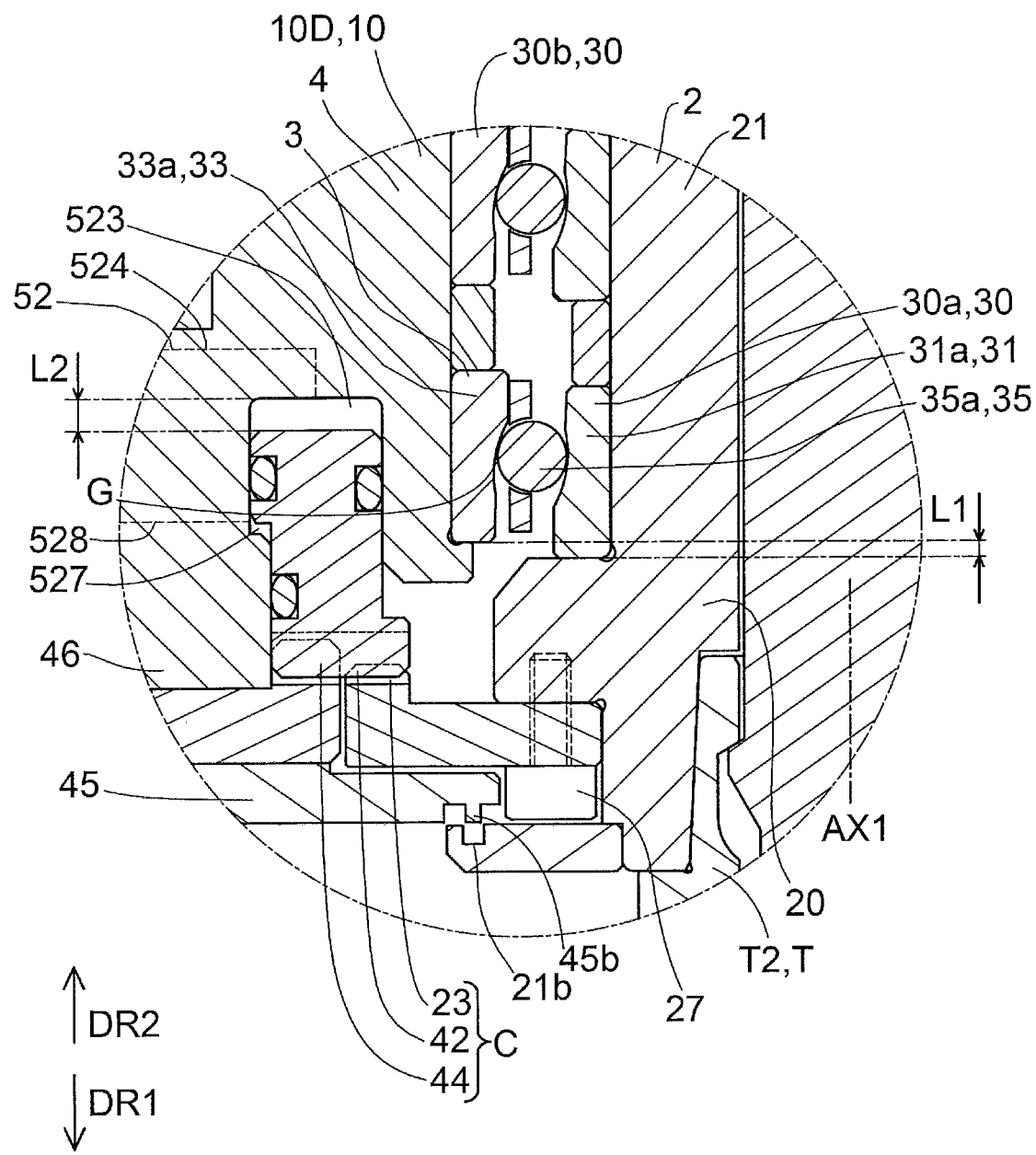
FIG. 26 is an enlarged view of the section indicated by circle A9 in FIG. 25.

More specifically, in the embodiment illustrated in FIG. 26, the second drive unit 52 decreases the hydraulic pressure in the second oil chamber 523 and increases the hydraulic pressure in the third oil chamber 527. When the hydraulic pressure in the third oil chamber 527 is increased, the second coupling 42 moves in the second direction DR2, so that the second coupling 42 and the first coupling 23 are disengaged from each other. In the embodiment illustrated in FIG. 25, the first oil chamber 513 and the second oil chamber 523 are connected to each other through the first pipe 514 and the second pipe 524. Thus, when the hydraulic pressure in the second oil chamber 523 is decreased, the hydraulic pressure in the first oil chamber 513 is also decreased.

When the second coupling 42 is disengaged from the first coupling 23, the first pressing force in the first direction DR1 that the rotary shaft 2 has received from the second coupling 42 is removed. As a result, the rotary shaft 2 and the inner ring 31 move relative to the support member 4 and the outer ring 33 in the second direction DR2 by the second pressing force in the second direction DR2 that the rotary shaft 2 receives from the first drive unit 51 (more specifically, the first urging member 516). The relative movement increases the precompression that acts on the plurality of balls 35.

First Coupling 23

In the embodiment illustrated in FIG. 26, the rotary shaft 2 includes the rotary shaft body 20 and the first coupling 23, which is secured to the rotary shaft body 20 using the fastener 27. Additionally, in the embodiment illustrated in FIG. 26, the first coupling 23 is located forward of the first angular contact ball bearing 3.

In the embodiment illustrated in FIG. 27, the first coupling 23 includes the first teeth 23a. The first teeth 23a project toward the second coupling 42.

The first coupling 23 may include the plurality of first teeth 23a and the first annular body 23c on which the plurality of first teeth 23a are located. In the embodiment illustrated in FIG. 27, the first teeth 23a each have the distal end face 230a. The distal end faces 230a will be received by the recessed portions 42b of the second coupling 42. In the embodiment illustrated in FIG. 27, each of the first teeth 23a has the first contact surfaces C1 (more specifically, the first inclined surfaces M1). In the embodiment illustrated in FIG. 27, the first inclined surfaces M1 are located on both sides of the distal end face 230a of each of the first teeth 23a.

Second Coupling 42

In the embodiment illustrated in FIG. 25, the support member 4 includes the first block 46, which supports the outer ring 33 of the first angular contact ball bearing 3, and the second coupling 42, which is movable relative to the first block 46. The second coupling 42 is a movable coupling that is movable relative to the first block 46. The second coupling 42 is, for example, a piston driven by hydraulic pressure.

In the embodiment illustrated in FIG. 28, the second coupling 42 includes the second teeth 42a. The second teeth 42a project toward the first coupling 23.

The second coupling 42 may include the plurality of second teeth 42a and a second annular body 42c on which the plurality of second teeth 42a are located. In the embodiment illustrated in FIG. 28, the second coupling 42 includes the recessed portions 42b each of which is formed between two adjacent second teeth 42a. In the embodiment illustrated in FIG. 28, each of the second teeth 42a has the second contact surfaces C2 (more specifically, the second inclined surfaces M2). In the embodiment illustrated in FIG. 28, the second inclined surfaces M2 are located on both sides of a distal end face 420a of each of the second teeth 42a.

In the state in which the rotation of the rotary shaft 2 is locked, the second contact surfaces C2 of the second coupling 42 abut against the first contact surfaces C1 of the first coupling 23 and the third contact surfaces C3 of the third coupling 44. By contrast, in the state in which the rotary shaft 2 is rotatable about the first axis AX1, the second contact surfaces C2 of the second coupling 42 are separate from the first contact surfaces C1 of the first coupling 23 and the third contact surfaces C3 of the third coupling 44.

Third Coupling 44

In the embodiment illustrated in FIG. 25, the support member 4 includes the third coupling 44. The third coupling 44 is a fixed coupling fixed to the first block 46.

In the embodiment illustrated in FIG. 27, the third coupling 44 is located outward of and concentrically to the first coupling 23. The third coupling 44 includes third teeth 44a. The third teeth 44a project toward the second coupling 42.

The third coupling 44 may include the plurality of third teeth 44a and a third annular body 44c on which the plurality of third teeth 44a are located. In the embodiment illustrated in FIG. 27, the third teeth 44a each have a distal end face 440a. The distal end faces 440a will be received by the recessed portions 42b of the second coupling 42. In the embodiment illustrated in FIG. 27, each of the third teeth 44a has the third contact surfaces C3 (more specifically, the third inclined surfaces M3). In the embodiment illustrated in FIG. 27, the third inclined surfaces M3 are located on both sides of the distal end face 440a of each of the third teeth 44a of the third coupling 44.

Support Member 4

In the embodiment illustrated in FIG. 25, the support member 4 includes the first end wall 45, the second coupling 42, the third coupling 44, the first block 46, which supports the outer ring 33 of the first angular contact ball bearing 3, and the side wall 47, which covers at least the middle portion 24 of the rotary shaft 2.

Fifth Embodiment

Figure 29:
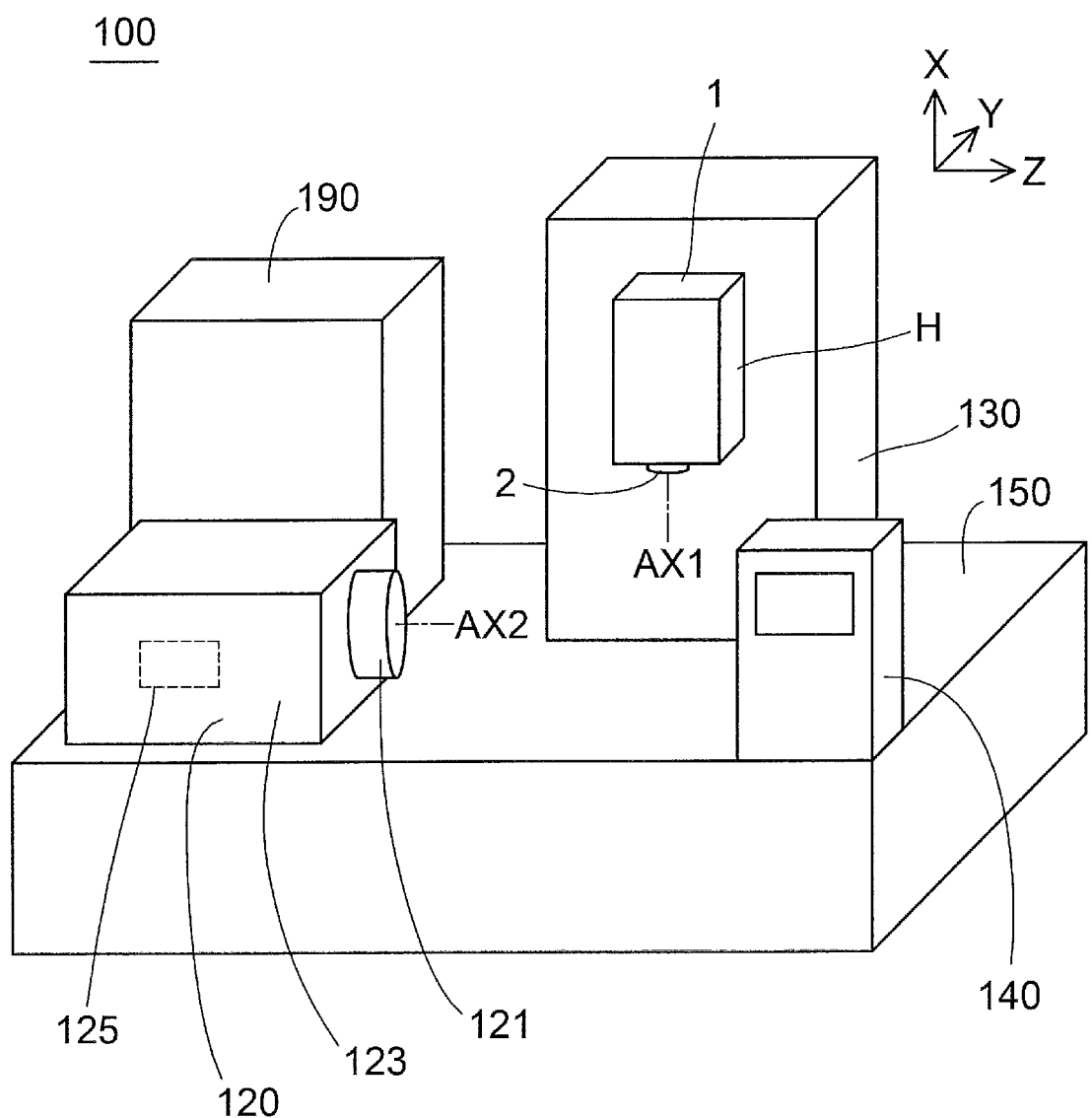
FIG. 29 is a schematic perspective view of a multi-tasking machine according to a fifth embodiment.

The multi-tasking machine 100 according to a fifth embodiment will be described with reference to FIGS. 1 to 29. FIG. 29 is a schematic perspective view of the multi-tasking machine 100 according to the fifth embodiment.

The multi-tasking machine 100 according to the fifth embodiment includes the machining head 1, a workpiece holding device 120, a machining head drive unit (an example of a "machining head actuator") 130, and a controller 140. The multi-tasking machine means a machine tool that can perform different kinds of machining operations. In the embodiment illustrated in FIG. 29, the multi-tasking machine 100 is capable of selectively executing at least turning and milling. The multi-tasking machine 100 may include an automatic tool changer 190, which automatically changes the tool mounted on the rotary shaft 2 to another tool.

Machining Head 1

The machining head 1 includes the rotary shaft locking device 10, the first rotary drive unit 7, which rotates the rotary shaft 2 about the first axis AX1, and the housing H, which surrounds the rotary shaft 2. The rotary shaft locking device 10 may be the rotary shaft locking device 10A according to the first embodiment, the rotary shaft locking device 10B according to the second embodiment, the rotary shaft locking device 10C according to the third embodiment, the rotary shaft locking device 10D according to the fourth embodiment, or other rotary shaft locking devices.

The rotary shaft locking device 10 includes (1) the rotary shaft 2, which includes the mounting portion 22 on which the tool T will be mounted and the first contact surface(s) C1 and is rotatable about the first axis AX1, (2) the first angular contact ball bearing 3, which includes the inner ring 31 supported by the rotary shaft 2, the outer ring 33, and the plurality of balls 35 located between the inner ring 31 and the outer ring 33, (3) the support member 4, which includes the second contact surface(s) C2 that comes into contact with the first contact surface(s) C1 to lock the rotation of the rotary shaft 2 and rotatably supports the rotary shaft 2 through the first angular contact ball bearing 3, and (4) the drive unit 5, which moves the rotary shaft 2 and the inner ring 31 relative to the support member 4 and the outer ring 33 in the first direction DR1 parallel to the first axis AX1.

Since the rotary shaft locking device 10 has been described in the first embodiment to the fourth embodiment, redundant descriptions of the rotary shaft locking device 10 are omitted.

Workpiece Holding Device 120

The workpiece holding device 120 holds a workpiece. The workpiece holding device 120 includes a workpiece holder 121 (for example, a chuck), which holds the workpiece, a second support member 123, which rotatably supports the workpiece holder 121 about a second axis AX2, and a second rotary drive unit 125 (for example, a second motor), which rotates the workpiece holder 121 about the second axis AX2. With the lathe tool T2 that is mounted on the rotary shaft 2 of the rotary shaft locking device 10 in contact with the workpiece, the workpiece and the workpiece holder 121 are rotated about the second axis AX2, so that turning of the workpiece is performed. In the embodiment illustrated in FIG. 29, the workpiece holding device 120 is supported by a base 150.

Machining Head Drive Unit 130

The machining head drive unit 130 moves the machining head 1 relative to the workpiece holding device 120. The machining head drive unit 130 may be a drive unit that can move the machining head 1 three-dimensionally. More specifically, the machining head drive unit 130 may be capable of moving the machining head 1 along a Z axis, an X axis, which is perpendicular to the Z axis, and a Y axis, which is perpendicular to both the X axis and the Z axis. In the embodiment illustrated in FIG. 29, the machining head drive unit 130 is supported by the base 150.

Controller 140

The controller 140 controls the operation of the drive unit 5, the first rotary drive unit 7, the second rotary drive unit 125, and the machining head drive unit 130.

In response to the controller 140 transmitting a first control signal to the machining head drive unit 130, the machining head drive unit 130 moves the machining head 1 relative to the workpiece holding device 120. In this manner, the tool T mounted on the rotary shaft 2 is moved toward or away from the workpiece.

In response to the controller 140 transmitting a second control signal to the first rotary drive unit 7, the first rotary drive unit 7 rotates the rotary shaft 2 about the first axis AX1. In this manner, milling of the workpiece is performed using the milling tool T1 mounted on the rotary shaft 2.

In response to the controller 140 transmitting a third control signal to the second rotary drive unit 125, the second rotary drive unit 125 rotates the workpiece holder 121 about the second axis AX2. In this manner, the workpiece held by the workpiece holder 121 is turned using the lathe tool T2 mounted on the rotary shaft 2.

In response to the controller 140 transmitting a fourth control signal to the drive unit 5 (for example, to the first drive unit 51 or to the first drive unit 51 and the second drive unit 52), the drive unit 5 moves the rotary shaft 2 and the inner ring 31 relative to the support member 4 and the outer ring 33 in the first direction DR1 so that the first contact surface(s) C1 comes into contact with the second contact surface(s) C2 and so that the precompression that acts on the plurality of balls 35 is reduced.

In the embodiment illustrated in FIG. 5 or FIG. 10, in response to receiving the fourth control signal, the drive unit 5 (more specifically, the first drive unit 51) moves the first movable member 510 in the first direction DR1. When the first movable member 510 moves in the first direction DR1, the rotary shaft 2 pressed by the first movable member 510 moves relative to the support member 4 in the first direction DR1. When the rotary shaft 2 moves relative to the support member 4 in the first direction DR1, the first contact surface(s) C1 of the rotary shaft 2 comes into contact with the second contact surface(s) C2 of the support member 4, so that the rotation of the rotary shaft 2 is locked. Additionally, when the rotary shaft 2 moves relative to the support member 4 in the first direction DR1, the inner ring 31, which is supported by the rotary shaft 2, moves relative to the outer ring 33, which is supported by the support member 4, in the first direction DR1. As a result, the precompression that the plurality of balls 35 receive from the inner ring 31 and the outer ring 33 is reduced. Typically, the plurality of balls 35 are each allowed to move relative to the outer ring 33 and the inner ring 31 in any direction (in other words, all directions), and the load that acts on the plurality of balls 35 from the inner ring 31 is not transmitted to the outer ring 33.

In the embodiment illustrated in FIGS. 17 and 18, in response to the drive unit 5 (more specifically, the first drive unit 51 and the second drive unit 52) receiving the fourth control signal, the second drive unit 52 moves the second coupling 42 in the second direction DR2, and the first drive unit 51 moves the first movable member 510 in the first direction DR1. When the second coupling 42 moves in the second direction DR2, the second coupling 42 engages with both the first coupling 23, which is located on the rotary shaft 2, and the third coupling 44, which is located on the support member 4. This locks the rotation of the rotary shaft 2. Additionally, when the first movable member 510 moves in the first direction DR1, the rotary shaft 2 pressed by the first movable member 510 moves relative to the support member 4 in the first direction DR1. When the rotary shaft 2 moves relative to the support member 4 in the first direction DR1, the inner ring 31, which is supported by the rotary shaft 2, moves relative to the outer ring 33, which is supported by the support member 4, in the first direction DR1. As a result, the precompression that the plurality of balls 35 receive from the inner ring 31 and the outer ring 33 is reduced.

In the embodiment illustrated in FIGS. 23 and 24, in response to the drive unit 5 (more specifically, the first drive unit 51 and the second drive unit 52) receiving the fourth control signal, the second drive unit 52 moves the second coupling 42 in the first direction DR1, and the first drive unit 51 applies the second pressing force to the rotary shaft 2 in the second direction DR2. When the second coupling 42 moves in the first direction DR1, the second coupling 42 engages with both the first coupling 23, which is located on the rotary shaft 2, and the third coupling 44, which is located on the support member 4. This locks the rotation of the rotary shaft 2. Additionally, when the second coupling 42 moves in the first direction DR1, the second coupling 42 applies the first pressing force greater than the above-mentioned second pressing force to the rotary shaft 2 in the first direction DR1. The rotary shaft 2 that receives the first pressing force greater than the second pressing force moves relative to the support member 4 in the first direction DR1. When the rotary shaft 2 moves relative to the support member 4 in the first direction DR1, the inner ring 31, which is supported by the rotary shaft 2, moves relative to the outer ring 33, which is supported by the support member 4, in the first direction DR1. As a result, the precompression that the plurality of balls 35 receive from the inner ring 31 and the outer ring 33 is reduced. Typically, the plurality of balls 35 are each allowed to move relative to the outer ring 33 and the inner ring 31 in any direction (in other words, all directions), and the load that acts on the plurality of balls 35 from the inner ring 31 is not transmitted to the outer ring 33.

In this manner, in the state in which the rotation of the rotary shaft 2 is locked, the load that acts on the plurality of balls 35 of the first angular contact ball bearing 3 is reduced.

In response to the controller 140 transmitting a fifth control signal to the drive unit 5 (for example, to the first drive unit 51 or to the first drive unit 51 and the second drive unit 52), the drive unit 5 moves the rotary shaft 2 and the inner ring 31 relative to the support member 4 and the outer ring 33 in the second direction DR2 so that the first contact surface(s) C1 separates from the second contact surface(s) C2 and so that the precompression that acts on the plurality of balls 35 is increased.

In the embodiment illustrated in FIG. 8 or FIG. 14, in response to receiving the fifth control signal, the drive unit 5 (more specifically, the first drive unit 51) moves the first movable member 510 in the second direction DR2. For example, when the first movable member 510 receives an urging force from the first urging member 516 in the second direction DR2, the first movable member 510 moves in the second direction DR2. When the first movable member 510 moves in the second direction DR2, the rotary shaft 2 pressed by the first movable member 510 moves relative to the support member 4 in the second direction DR2. When the rotary shaft 2 moves relative to the support member 4 in the second direction DR2, the first contact surface(s) C1 of the rotary shaft 2 separates from the second contact surface (s) C2 of the support member 4, so that the rotary shaft 2 is unlocked. Additionally, when the rotary shaft 2 moves relative to the support member 4 in the second direction DR2, the inner ring 31, which is supported by the rotary shaft 2, moves relative to the outer ring 33 in the second direction DR2. As a result, the precompression that the plurality of balls 35 receive from the inner ring 31 and the outer ring 33 is increased.

In the embodiment illustrated in FIGS. 20 and 21, in response to the drive unit 5 (more specifically, the first drive unit 51 and the second drive unit 52) receiving the fifth control signal, the second drive unit 52 moves the second coupling 42 in the first direction DR1, and the first drive unit 51 moves the first movable member 510 in the second direction DR2. When the second coupling 42 moves in the first direction DR1, the second coupling 42 is disengaged from the first coupling 23, which is located on the rotary shaft 2. This unlocks the rotary shaft 2. Additionally, when the first movable member 510 moves in the second direction DR2, the rotary shaft 2 pressed by the first movable member 510 moves relative to the support member 4 in the second direction DR2. When the rotary shaft 2 moves relative to the support member 4 in the second direction DR2, the inner ring 31, which is supported by the rotary shaft 2, moves relative to the outer ring 33 in the second direction DR2. As a result, the precompression that the plurality of balls 35 receive from the inner ring 31 and the outer ring 33 is increased.

In the embodiment illustrated in FIGS. 25 and 26, in response to the drive unit 5 (more specifically, the first drive unit 51 and the second drive unit 52) receiving the fifth control signal, the second drive unit 52 moves the second coupling 42 in the second direction DR2, and the first drive unit 51 (more specifically, the first urging member 516) moves the first movable member 510 in the second direction DR2.

When the second coupling 42 moves in the second direction DR2, the second coupling 42 is disengaged from the first coupling 23, which is located on the rotary shaft 2. This unlocks the rotary shaft 2. Additionally, when the first movable member 510 moves in the second direction DR2, the rotary shaft 2 pressed by the first movable member 510 moves relative to the support member 4 in the second direction DR2. When the rotary shaft 2 moves relative to the support member 4 in the second direction DR2, the inner ring 31, which is supported by the rotary shaft 2, moves relative to the outer ring 33 in the second direction DR2. As a result, the precompression that the plurality of balls 35 receive from the inner ring 31 and the outer ring 33 is increased.

It should be clearly understood that the present invention is not limited to the above-described embodiments, and each of the embodiments or modifications may be deformed or modified as required within the range of the technical ideas obtainable from the present invention. Various techniques used in each of the embodiments or modifications may be applied to other embodiments or modifications unless a technical contradiction arises. Furthermore, any optional structure in each of the embodiments or modifications may be omitted as required.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A rotary shaft locking device comprising:
   a rotary shaft which is rotatable about a first axis and which has a first contact surface and a mounting portion on which a tool is configured to be mounted;
   a first angular contact ball bearing comprising:
      an inner ring connected to the rotary shaft to surround the rotary shaft around the first axis such that the inner ring is rotatable together with the rotary shaft around the first axis;
      an outer ring provided opposite to the inner ring to surround the inner ring around the first axis;
      a plurality of balls disposed between the inner ring and the outer ring such that the outer ring supports the inner ring via the plurality of balls and such that the inner ring and the outer ring are relatively rotatable around the first axis;
   a support to which the outer ring is connected and which rotatably supports the rotary shaft via the first angular contact ball bearing, the support having a second contact surface which is configured to contact the first contact surface to prohibit the rotary shaft from rotating; and
   an actuator configured to move the rotary shaft and the inner ring with respect to the support and the outer ring in a first direction parallel to the first axis so that the first contact surface contacts the second contact surface and so that precompression that acts on the plurality of balls is reduced.

2. The rotary shaft locking device according to claim 1, wherein the actuator is configured to move the rotary shaft and the inner ring with respect to the support and the outer ring in the first direction to allow the plurality of balls to move in any direction with respect to the inner ring and the outer ring.

3. The rotary shaft locking device according to claim 2, wherein the actuator is configured to change from an unlocked state in which the rotary shaft is rotatable to a locked state in which the rotary shaft is locked by moving the rotary shaft and the inner ring with respect to the support and the outer ring in the first direction, and
wherein first precompression that acts on the plurality of balls in the locked state is smaller than second precompression that acts on the plurality of balls in the unlocked state.

4. The rotary shaft locking device according to claim 2, wherein the rotary shaft has a first coupling,
wherein the support has a second coupling, and
wherein the first coupling and the second coupling are configured to engage with each other to prohibit the rotary shaft from rotating.

5. The rotary shaft locking device according to claim 4, wherein the support has a third coupling,
wherein the second coupling is movable relative to the third coupling, and
wherein the actuator includes a second actuator configured to move the second coupling to be engaged with both the first coupling and the third coupling.

6. The rotary shaft locking device according to claim 1, wherein the actuator is configured to change from an unlocked state in which the rotary shaft is rotatable to a locked state in which the rotary shaft is locked by moving the rotary shaft and the inner ring with respect to the support and the outer ring in the first direction, and
wherein first precompression that acts on the plurality of balls in the locked state is smaller than second precompression that acts on the plurality of balls in the unlocked state.

7. The rotary shaft locking device according to claim 6, wherein the rotary shaft has a first coupling,
wherein the support has a second coupling, and
wherein the first coupling and the second coupling are configured to engage with each other to prohibit the rotary shaft from rotating.

8. The rotary shaft locking device according to claim 7, wherein the support has a third coupling,
wherein the second coupling is movable relative to the third coupling, and
wherein the actuator includes a second actuator configured to move the second coupling to be engaged with both the first coupling and the third coupling.

9. The rotary shaft locking device according to claim 1, wherein the inner ring has a first shoulder portion,
wherein the outer ring has a second shoulder portion, and
wherein, when the inner ring moves relative to the outer ring in the first direction, the first shoulder portion moves in a direction away from the second shoulder portion.

10. The rotary shaft locking device according to claim 1, wherein the actuator has a first movable member configured to press the rotary shaft along the first axis, and
wherein the first movable member is located rearward of the first angular contact ball bearing.

11. The rotary shaft locking device according to claim 1, further comprising:
a second angular contact ball bearing comprising:
a second inner ring connected to the rotary shaft to surround the rotary shaft around the first axis such that the second inner ring is rotatable together with the rotary shaft around the first axis;
a second outer ring provided to surround the second inner ring around the first axis; and
a plurality of second balls disposed between the second inner ring and the second outer ring such that the second outer ring supports the second inner ring via the plurality of second balls and such that the second inner ring and the second outer ring are relatively rotatable around the first axis,
wherein the actuator is configured to move the second angular contact ball bearing, the rotary shaft, and the inner ring relative to the support and the outer ring in the first direction.

12. The rotary shaft locking device according to claim 1, wherein the first contact surface has a first inclined surface inclined with respect to the first axis,
wherein the second contact surface has a second inclined surface inclined with respect to the first axis, and
wherein the first inclined surface is configured to contact the second inclined surface to prohibit the rotary shaft from rotating.

13. The rotary shaft locking device according to claim 1, wherein the rotary shaft has a first coupling,
wherein the support has a second coupling, and
wherein the first coupling and the second coupling are configured to engage with each other to prohibit the rotary shaft from rotating.

14. The rotary shaft locking device according to claim 13, wherein the support has a third coupling,
wherein the second coupling is movable relative to the third coupling, and
wherein the actuator includes a second actuator configured to move the second coupling to be engaged with both the first coupling and the third coupling.

15. The rotary shaft locking device according to claim 14, wherein a motion stroke of the inner ring is smaller than a motion stroke of the second coupling.

16. The rotary shaft locking device according to claim 14, wherein the second coupling is disposed rearward of the first coupling and the third coupling.

17. The rotary shaft locking device according to claim 16, wherein the second actuator is configured to move the second coupling, the rotary shaft, and the inner ring integrally in the first direction while the second coupling engages with the first coupling.

18. The rotary shaft locking device according to claim 17, wherein the actuator comprises a first actuator configured to apply a second pressing force to the rotary shaft in a second direction opposite to the first direction.

19. A machining head comprising:
a first rotary actuator configured to rotate a rotary shaft about a first axis;
a housing surrounding the rotary shaft; and
a rotary shaft locking device comprising:
the rotary shaft which is rotatable about the first axis and which has a first contact surface and a mounting portion on which a tool is configured to be mounted;
a first angular contact ball bearing comprising:
an inner ring connected to the rotary shaft to surround the rotary shaft around the first axis such that the inner ring is rotatable together with the rotary shaft around the first axis;
an outer ring provided opposite to the inner ring to surround the inner ring around the first axis; and
a plurality of balls disposed between the inner ring and the outer ring such that the outer ring supports the inner ring via the plurality of balls and such that the inner ring and the outer ring are relatively rotatable around the first axis;
a support to which the outer ring is connected and which rotatably supports the rotary shaft via the first angular contact ball bearing, the support having a second contact surface which is configured to contact the first contact surface to prohibit the rotary shaft from rotating; and
an actuator configured to move the rotary shaft and the inner ring with respect to the support and the outer ring in a first direction parallel to the first axis so that the first contact surface contacts the second contact surface and so that precompression that acts on the plurality of balls is reduced.

20. A multi-tasking machine comprising:
a machining head comprising:
  a rotary shaft locking device;
  a first rotary actuator configured to rotate a rotary shaft about a first axis; and
  a housing surrounding the rotary shaft;
a workpiece holding device configured to hold a workpiece;
a machining head actuator configured to move the machining head relative to the workpiece holding device; and
a controller,
wherein the rotary shaft locking device comprises
  the rotary shaft which is rotatable about the first axis and which has a first contact surface and a mounting portion on which a tool is configured to be mounted,
  a first angular contact ball bearing comprising:
    an inner ring connected to the rotary shaft to surround the rotary shaft around the first axis such that the inner ring is rotatable together with the rotary shaft around the first axis;
    an outer ring provided opposite to the inner ring to surround the inner ring around the first axis; and
    a plurality of balls disposed between the inner ring and the outer ring such that the outer ring supports the inner ring via the plurality of balls and such that the inner ring and the outer ring are relatively rotatable around the first axis;
  a support to which the outer ring is connected and which rotatably supports the rotary shaft via the first angular contact ball bearing, the support having a second contact surface which is configured to contact the first contact surface to prohibit the rotary shaft from rotating, and
  an actuator configured to move the rotary shaft and the inner ring with respect to the support and the outer ring in a first direction parallel to the first axis,
wherein the workpiece holding device comprises
  a workpiece holder configured to hold a workpiece,
  a second support configured to support the workpiece holder to be rotatable about a second axis, and
  a second rotary actuator configured to rotate the workpiece holder about the second axis,
wherein the machining head actuator is configured to move the machining head relative to the workpiece holding device when the controller transmits a first control signal to the machining head actuator,
wherein the first rotary actuator is configured to rotate the rotary shaft about the first axis when the controller transmits a second control signal to the first rotary actuator,
wherein the second rotary actuator is configured to rotate the workpiece holder about the second axis when the controller transmits a third control signal to the second rotary actuator, and
wherein, when the controller transmits a fourth control signal to the actuator, the actuator is configured to move the rotary shaft and the inner ring relative to the support and the outer ring in the first direction so that the first contact surface contacts the second contact surface and so that precompression that acts on the plurality of balls is reduced.

* * * * *